(12) United States Patent
Perez

(10) Patent No.: US 10,730,472 B2
(45) Date of Patent: Aug. 4, 2020

(54) AIRBAG AND METHOD FOR PROTECTING AN OCCUPANT OF A VEHICLE

(71) Applicant: TRW Vehicle Safety Systems Inc., Washington, MI (US)

(72) Inventor: Jaime Fermin Perez, Lake Orion, MI (US)

(73) Assignee: TRW VEHICLE SAFETY SYSTEMS INC., Washington, MI (US)

( * ) Notice: Subject to any disclaimer, the term of this patent is extended or adjusted under 35 U.S.C. 154(b) by 34 days.

(21) Appl. No.: 16/167,583

(22) Filed: Oct. 23, 2018

(65) Prior Publication Data

US 2020/0122675 A1 Apr. 23, 2020

(51) Int. Cl.
| | |
|---|---|
| *B60R 21/233* | (2006.01) |
| *B60R 21/239* | (2006.01) |
| *B60R 21/2338* | (2011.01) |
| *B60R 21/203* | (2006.01) |
| *B60R 21/205* | (2011.01) |
| *B60R 21/00* | (2006.01) |
| *B60R 21/231* | (2011.01) |

(52) U.S. Cl.
CPC .......... *B60R 21/233* (2013.01); *B60R 21/203* (2013.01); *B60R 21/205* (2013.01); *B60R 21/239* (2013.01); *B60R 21/2338* (2013.01); *B60R 2021/0009* (2013.01); *B60R 2021/0023* (2013.01); *B60R 2021/2395* (2013.01); *B60R 2021/23107* (2013.01); *B60R 2021/23324* (2013.01)

(58) Field of Classification Search
CPC ... B60R 21/233; B60R 21/239; B60R 21/205; B60R 21/2338; B60R 21/203; B60R 2021/23324; B60R 2021/23107; B60R 2021/0009; B60R 2021/2395; B60R 2021/0023
See application file for complete search history.

(56) References Cited

U.S. PATENT DOCUMENTS

| | | | |
|---|---|---|---|
| 6,382,666 B1 | 5/2002 | Devonport | |
| 9,272,684 B1 * | 3/2016 | Keyser | B60R 21/237 |

(Continued)

FOREIGN PATENT DOCUMENTS

DE 102013200667 A1 7/2014

*Primary Examiner* — Drew J Brown
(74) *Attorney, Agent, or Firm* — Tarolli, Sundheim, Covell & Tummino LLP

(57) ABSTRACT

An apparatus for helping to protect an occupant of a vehicle comprises an airbag having a primary chamber and a secondary chamber. The primary chamber has a stored condition and is inflatable to a deployed condition to cover a portion of the vehicle. The secondary chamber has a stored condition and is inflatable to a deployed condition to cover portions of the vehicle left uncovered by the primary chamber. At least one passive vent provides fluid communication between the primary and secondary chambers. At least one active vent is actuatable to provide fluid communication between the primary and secondary chambers. An inflator is actuatable to provide inflation fluid to the primary chamber. The at least one passive vent directs inflation fluid from the primary chamber into the secondary chamber. The at least one active vent is actuatable to direct inflation fluid from the primary chamber to the secondary chamber.

21 Claims, 11 Drawing Sheets

(56) References Cited

U.S. PATENT DOCUMENTS

| | | |
|---|---|---|
| 9,566,929 B1 | 2/2017 | Belwafa |
| 9,650,011 B1 | 5/2017 | Belwafa |
| 9,731,677 B1 | 8/2017 | Belwafa |
| 9,821,746 B1 | 11/2017 | O'Connor |
| 9,994,181 B1 | 6/2018 | Dubaisi |
| 10,053,040 B1 | 8/2018 | O'Connor |
| 2014/0239619 A1 | 8/2014 | Fukawatase |
| 2014/0306497 A1 | 10/2014 | Fukawatase |
| 2014/0361521 A1 | 12/2014 | Fukawatase |
| 2014/0375033 A1 | 12/2014 | Fukawatase |
| 2015/0014967 A1 | 1/2015 | Kang |
| 2015/0115581 A1 | 4/2015 | Mazanek |
| 2015/0137494 A1 | 5/2015 | Le |
| 2015/0158452 A1* | 6/2015 | Choi ............... B60R 21/233 280/732 |
| 2015/0166002 A1 | 6/2015 | Fukawatase |
| 2015/0175110 A1 | 6/2015 | Kalandek |
| 2015/0197210 A1 | 7/2015 | Abe |
| 2015/0258959 A1* | 9/2015 | Belwafa ............ B60R 21/233 280/729 |
| 2015/0298643 A1 | 10/2015 | Schneider |
| 2015/0307055 A1 | 10/2015 | Cheng |
| 2015/0307056 A1 | 10/2015 | Cheng |
| 2015/0343986 A1 | 12/2015 | Schneider |
| 2015/0367802 A1 | 12/2015 | Fukawatase |
| 2016/0009242 A1 | 1/2016 | Fukawatase |
| 2016/0023626 A1 | 1/2016 | Hiruta |
| 2016/0031402 A1 | 2/2016 | Ohno |
| 2016/0039385 A1 | 2/2016 | Watamori |
| 2016/0059816 A1 | 3/2016 | Je |
| 2016/0059817 A1 | 3/2016 | Umehara |
| 2016/0107602 A1 | 4/2016 | Nakashima |
| 2016/0107603 A1 | 4/2016 | Lee |
| 2016/0121838 A1 | 5/2016 | Kwon |
| 2016/0121839 A1 | 5/2016 | Ko |
| 2016/0159311 A1 | 6/2016 | Yamada |
| 2016/0185314 A1 | 6/2016 | Kawamura |
| 2016/0207490 A1 | 7/2016 | Yamada |
| 2016/0221525 A1 | 8/2016 | Weerappuli |
| 2016/0250993 A1 | 9/2016 | Nagatani |
| 2016/0280171 A1 | 9/2016 | Moeller |
| 2016/0280178 A1 | 9/2016 | Kruse |
| 2016/0288761 A1 | 10/2016 | Jayasuriya |
| 2016/0288762 A1 | 10/2016 | Deng |
| 2016/0297393 A1 | 10/2016 | Fukawatase |
| 2016/0311392 A1 | 10/2016 | Jindal |
| 2016/0347272 A1 | 12/2016 | Kato |
| 2017/0008475 A1 | 1/2017 | Kruse |
| 2017/0015270 A1* | 1/2017 | Ohno ............... B60R 21/233 |
| 2017/0015272 A1 | 1/2017 | Ohno |
| 2017/0028954 A1 | 2/2017 | Sumiya |
| 2017/0028955 A1 | 2/2017 | Ohno |
| 2017/0028956 A1 | 2/2017 | Ohno |
| 2017/0028960 A1 | 2/2017 | Kobayashi |
| 2017/0036639 A1 | 2/2017 | Yamada |
| 2017/0050608 A1 | 2/2017 | Meissner |
| 2017/0057453 A1 | 3/2017 | Morris |
| 2017/0057456 A1 | 3/2017 | Ohno |
| 2017/0072891 A1 | 3/2017 | Paxton |
| 2017/0072896 A1 | 3/2017 | Fukawatase |
| 2017/0072897 A1 | 3/2017 | Kruse |
| 2017/0088078 A1 | 3/2017 | Nagasawa |
| 2017/0088080 A1 | 3/2017 | Hotta |
| 2017/0088082 A1 | 3/2017 | Okuhara |
| 2017/0088083 A1 | 3/2017 | Hiraiwa |
| 2017/0088085 A1 | 3/2017 | Yoshikawa |
| 2017/0096118 A1 | 4/2017 | Kruse |
| 2017/0113643 A1 | 4/2017 | Mueller |
| 2017/0120854 A1 | 5/2017 | Fukawatase |
| 2017/0120855 A1 | 5/2017 | Deng |
| 2017/0120856 A1 | 5/2017 | Sumiya |
| 2017/0120858 A1 | 5/2017 | Deng |
| 2017/0129439 A1 | 5/2017 | Taguchi |
| 2017/0129444 A1 | 5/2017 | Fukawatase |
| 2017/0136976 A1 | 5/2017 | Ohno |
| 2017/0136977 A1 | 5/2017 | Ohno |
| 2017/0136981 A1 | 5/2017 | Fukawatase |
| 2017/0144622 A1 | 5/2017 | Perlo |
| 2017/0151924 A1 | 6/2017 | Ikenohata |
| 2017/0158154 A1 | 6/2017 | Kobayashi |
| 2017/0158155 A1 | 6/2017 | Ohno |
| 2017/0166158 A1 | 6/2017 | Oh |
| 2017/0166159 A1 | 6/2017 | Shin |
| 2017/0174171 A1 | 6/2017 | Dennis |
| 2017/0182966 A1 | 6/2017 | Choi |
| 2017/0182967 A1 | 6/2017 | Suzuki |
| 2017/0217397 A1 | 8/2017 | Sumiya |
| 2017/0217399 A1 | 8/2017 | Patel |
| 2017/0225788 A1* | 8/2017 | Humbert ............ B60R 21/18 |
| 2017/0232920 A1 | 8/2017 | Abe |
| 2017/0247007 A1 | 8/2017 | Lee |
| 2017/0253211 A1 | 9/2017 | Choi |
| 2017/0253212 A1 | 9/2017 | Choi |
| 2017/0274859 A1 | 9/2017 | Heurlin |
| 2017/0282827 A1 | 10/2017 | Choi |
| 2017/0282833 A1 | 10/2017 | Nagatsu |
| 2017/0282834 A1 | 10/2017 | Sugie |
| 2017/0291564 A1 | 10/2017 | Ohmi |
| 2017/0291565 A1 | 10/2017 | Yamamoto |
| 2017/0291569 A1 | 10/2017 | Sugie |
| 2017/0297524 A1 | 10/2017 | Sugie |
| 2017/0313276 A1 | 11/2017 | Yoo |
| 2017/0334383 A1 | 11/2017 | Paxton |
| 2017/0334385 A1 | 11/2017 | Sakakibara |
| 2017/0355342 A1 | 12/2017 | Deng |
| 2017/0355343 A1 | 12/2017 | Oh |
| 2017/0355345 A1 | 12/2017 | Moritani |
| 2017/0355346 A1 | 12/2017 | Kobayashi |
| 2017/0369019 A1 | 12/2017 | Jeong |
| 2018/0001863 A1 | 1/2018 | Nakanishi |
| 2018/0009405 A1 | 1/2018 | Oh |
| 2018/0022303 A1 | 1/2018 | Yamada |
| 2018/0029557 A1 | 2/2018 | Yamada |
| 2018/0043853 A1 | 2/2018 | Taguchi |
| 2018/0050652 A1 | 2/2018 | Jung |
| 2018/0050654 A1 | 2/2018 | Spahn |
| 2018/0056920 A1 | 3/2018 | Paxton |
| 2018/0056922 A1 | 3/2018 | Yamada |
| 2018/0056925 A1 | 3/2018 | Yamada |
| 2018/0065581 A1 | 3/2018 | Ohno |
| 2018/0065583 A1 | 3/2018 | Tabushi |
| 2018/0065587 A1 | 3/2018 | Maenishi |
| 2018/0065590 A1 | 3/2018 | Jindal |
| 2018/0079341 A1 | 3/2018 | Nishimura |
| 2018/0079382 A1 | 3/2018 | Yoo |
| 2018/0079383 A1 | 3/2018 | O'Connor |
| 2018/0105133 A1 | 4/2018 | Ballam |
| 2018/0111581 A1 | 4/2018 | Wang |
| 2018/0111583 A1 | 4/2018 | Jaradi |
| 2018/0118151 A1 | 5/2018 | Weerappuli |
| 2018/0126945 A1 | 5/2018 | Aranzulla |
| 2018/0134244 A1 | 5/2018 | Choi |
| 2018/0154856 A1 | 6/2018 | Yamada |
| 2018/0154857 A1 | 6/2018 | Yamada |
| 2018/0162311 A1 | 6/2018 | Moon |
| 2018/0162312 A1 | 6/2018 | Faruque |
| 2018/0170300 A1 | 6/2018 | Patel |
| 2018/0170301 A1 | 6/2018 | Alarcon Hernandez |
| 2018/0194317 A1 | 7/2018 | Barbat |
| 2018/0208142 A1 | 7/2018 | Barbat |
| 2018/0215340 A1 | 8/2018 | Zhang |
| 2018/0222432 A1 | 8/2018 | Schneider |
| 2018/0229681 A1 | 8/2018 | Jaradi |
| 2018/0236962 A1 | 8/2018 | Ohno |
| 2018/0251093 A1 | 9/2018 | Rose |
| 2018/0251096 A1 | 9/2018 | Fischer |
| 2018/0265030 A1 | 9/2018 | Park |
| 2018/0281731 A1 | 10/2018 | Hotta |
| 2019/0106074 A1* | 4/2019 | Jeong ............... B60R 21/26 |

* cited by examiner

AIRBAG AND METHOD FOR PROTECTING AN OCCUPANT OF A VEHICLE

FIELD OF THE INVENTION

The present invention relates to an apparatus for helping to protect an occupant of a vehicle. More particularly, the present invention relates to an airbag inflatable between an instrument panel and a front seat of a vehicle.

BACKGROUND

It is known to provide an inflatable vehicle occupant protection device, such as an airbag, for helping to protect an occupant of a vehicle. Airbags are deployable in response to the occurrence of an event for which occupant protection is desired, such as an impact to the vehicle, a vehicle collision, a vehicle rollover, or a combination thereof. Frontal collisions refer to collision events in which a vehicle experiences an impact at the front of the vehicle. These frontal collisions cause front seat vehicle occupants to move forward in the vehicle toward structures, such as the steering wheel (driver side occupant) and/or the instrument panel (passenger side occupant).

Frontal collisions of a vehicle can occur as a result of the vehicle travelling forward into an object, such as another vehicle, a tree, a pole, etc. Frontal collisions can also occur as a result of a stationary vehicle being impacted at the front by another vehicle. Frontal collisions can further occur as a result of two or more moving vehicles moving toward each other in a "head on" impact.

To help protect occupants of vehicles involved in frontal collisions, the vehicle can be equipped with frontal airbags. On the passenger side of the vehicle, passenger frontal airbags are typically deployed from a housing located within the instrument panel of the vehicle. Because the occupant on the passenger side is not charged with operating the vehicle, the passenger driver frontal airbag can be configured to cover a large area in front of the front passenger seat, i.e., the instrument panel, windshield, etc., and can extend laterally, in both outboard and inboard directions in the vehicle, for example, from adjacent or near the passenger door to adjacent or near the centerline of the instrument panel or even beyond.

The inflatable volume of passenger frontal airbags increases with the coverage that the airbag provides. Passenger airbags also typically have a substantial depth, so as to optimize the cushioning effect it has on an impacting occupant. Passenger frontal airbags need to reach the inflated and deployed condition within a predetermined amount of time, which is a fraction of a second. To do this, the inflator is sized to deliver inflation fluid at a volumetric flow rate that will result in deployment of the airbag within the required time. All of these factors must be considered and balanced when configuring a passenger frontal airbag system. There are limitations on inflator size (the volume of inflation fluid delivered by the inflator and the rate at which it is delivered) and, because of this, the configuration of the airbag (coverage, depth, volume, etc.) has to be matched and balanced accordingly. As a result, it can be desirable to optimize the passenger airbag in terms of coverage and depth, given the capabilities of the inflator.

On the driver side of the vehicle, driver frontal airbags are typically deployed from a housing located within the steering wheel. Because the occupant on the driver side is charged with operating the vehicle, the driver frontal airbag has to be configured with this in mind. For example, the operator may not be steering the vehicle in a straight forward direction at the time of the collision and, therefore, the steering wheel can be rotated when the airbag deploys. Because of this, steering wheel mounted airbags typically have a round/circular cushion configuration that coincides with the position and attitude of the steering wheel. Additionally, the driver frontal airbag must be configured taking into account that the operator of the vehicle will likely have one or both hands on the steering wheel at the time a collision takes place. Because of this, the steering wheel mounted airbag can be configured to have a diameter that is selected to provide adequate frontal impact protection while avoiding airbag deployment into contact with the operator's hands and arms.

One particular type of collision for which an airbag may be deployed can be referred to as an oblique collision. Oblique collisions are considered generally to be any non-frontal, i.e., any non-zero degree angle, vehicle collision. In its simplest form, a frontal, zero degree angle vehicle collision would involve a vehicle impacting, for example, a flat brick wall when the vehicle is travelling at a straight forward direction perpendicular to that wall. As a result of this impact, the occupant would move forward in a direction parallel to the vehicle axis and the direction of forward vehicle travel into contact with the deployed airbag. From this, it follows that an oblique collision, i.e., a non-frontal or non-zero angle collision, would be any collision scenario that results in the occupant moving relative to the central vehicle axis and direction of forward vehicle travel in a direction that is not parallel to the axis of straight forward vehicle travel.

Oblique collisions can occur in a variety of scenarios. For example, a vehicle travelling in a straight forward direction colliding with an angled surface, such as another vehicle oriented in a non-parallel manner, would be considered an oblique collision. As another example, an offset collision in which a vehicle collides with an object, such as another vehicle, that is offset laterally would be considered an oblique collision. This would be the case, for instance, in a vehicle collision in which the front passenger side bumper strikes the rear driver side bumper of another vehicle. As a further example, vehicles colliding when travelling in directions that are not parallel, i.e., at an angle, would be considered an oblique collision.

Additionally, in oblique collision scenarios causing forward-inboard movement of a seatbelt restrained occupant, whether a driver seat occupant or a passenger seat occupant, the movement of the occupant is in a direction that escapes the shoulder belt portion of the seatbelt. By "escapes," it is meant to refer to the fact that the shoulder belt restraint extends downward and inward from the outboard shoulder across the torso and around the inboard hip. This being the case, forward-inboard occupant movement can cause the occupant's torso to slip out from behind the shoulder belt, thereby becoming partially unbelted or unrestrained.

Oblique collisions produce occupant movements in the vehicle that are also oblique, that is, the occupant moves obliquely relative to a central axis of the frontal airbag, i.e., an axis that extends through a longitudinal centerline of the airbag, which extends parallel to the longitudinal axis of the vehicle. This oblique movement can be forward-outboard (i.e., toward the door) or forward-inboard (i.e., toward the vehicle centerline). Forward-outboard movement of an occupant in response to an oblique collision can be handled through the deployment of known side or lateral airbag structures, such as side curtains, door mounted side airbags, seat mounted side airbags, pillar mounted side airbags, etc.

Conventional airbag structures do not, however, cover for forward-inboard movement of the occupant. Additionally, forward-inboard moving occupants can escape the shoulder belt portion of the seatbelt, which presents further challenges.

Furthermore, prior to "escaping" in response to forward-inbound movement, the seatbelt can act on the occupant and apply restraining forces that alter the occupant's movement. For example, the seatbelt engages the occupant's outboard shoulder and, in response to the forward-inboard occupant movement, can cause the occupant to rotate toward the outboard side of the vehicle as he or she escapes the belt. As a result, the occupant can also be subjected to rotational forces that produce rotational occupant movements during an oblique vehicle collision.

Moreover, because the passenger airbag necessarily occupies a comparatively large volume, it can be challenging to provide the desired area of coverage within the necessary airbag deployment time. Since the passenger airbag is typically deployed centrally from the instrument panel, i.e., directly in front of the passenger side occupant, it can be difficult to configure the airbag to also expand laterally to provide adequate coverage for the passenger side occupant in the case of an oblique collision, while at the same time meeting deployment time requirements.

SUMMARY

According to one aspect, an apparatus for helping to protect an occupant of a vehicle comprises an airbag having a primary chamber and a secondary chamber. The primary chamber has a stored condition and is inflatable to a deployed condition to cover a portion of the vehicle and to help provide protection from impacts with the covered portion of the vehicle. The secondary chamber has a stored condition and is inflatable to a deployed condition to cover portions of the vehicle left uncovered by the primary chamber. At least one passive vent provides fluid communication between the primary and secondary chambers. At least one active vent is actuatable to provide fluid communication between the primary and secondary chambers. An inflator is actuatable to provide inflation fluid to the primary chamber to inflate the primary chamber. The at least one passive vent directs inflation fluid from the primary chamber into the secondary chamber. The at least one active vent is actuatable to direct inflation fluid from the primary chamber to the secondary chamber.

According to another aspect, alone or in combination with any other aspect, a flow rate of the inflation fluid flowing from the primary chamber into the secondary chamber when the active vent is actuated is greater than a flow rate of the inflation fluid flowing from the primary chamber to the secondary chamber when the active vent is not actuated.

According to another aspect, alone or in combination with any other aspect, the apparatus further comprises a controller configured to actuate the inflator and the actuatable vent in response to sensed conditions. The controller is configured to actuate the inflator in response to detecting the occurrence of an event for which inflation of the airbag is desired. The controller is configured to selectively actuate the active vent in response to detecting the occurrence of an event for which a more rapid inflation of the secondary chamber is desired.

According to another aspect, alone or in combination with any other aspect, the event for which a more rapid inflation of the secondary chamber is desired comprises at least one of an offset collision and an oblique collision.

According to another aspect, alone or in combination with any other aspect, the apparatus further comprises a tether via which the active vent can be maintained in a closed position acts on the active vent. A release device is selectively releasably connected to the tether. The release device is in electric communication with the controller. The controller is configured to selectively actuate the release device in response to detecting the occurrence of an event for which a more rapid inflation of the secondary chamber is desired. The actuation of the release device releases the connection between the release device and the tether so that the active vent is moved to an opened position.

According to another aspect, alone or in combination with any other aspect, during an initial deployment phase of the airbag, the active vent is in the closed position.

According to another aspect, alone or in combination with any other aspect, the occurrence of an event for which a more rapid inflation of the secondary chamber is desired comprises at least one of an offset collision and an oblique collision. If the collision event is at least one of an offset collision and an oblique collision, the controller actuates the release device to release the connection between the release device and the tether. The release of the connection between the release device and the tether moves the active vent to the opened position so that the active vent and the at least one passive vent directs inflation fluid from the primary chamber to the secondary chamber. If the collision event is not at least one of an offset collision and an oblique collision, the controller does not actuate the release device so that the connection between the release device and the tether is maintained. The maintenance of the connection between the release device and the tether holds the active vent in the closed position so that the at least one passive vent directs inflation fluid from the primary chamber to the secondary chamber.

According to another aspect, alone or in combination with any other aspect, the inflator is a dual-stage inflator having first and second combustion chambers. Each of the first and second combustion chambers has at least one exhaust port. The exhaust ports of the first and second combustion chambers are configured to provide inflation fluid to the primary chamber.

According to another aspect, alone or in combination with any other aspect, the apparatus further comprises a controller configured to actuate the inflator and the actuatable vent in response to sensed conditions. When the controller detects the occurrence of an event for which inflation of the airbag is desired, the controller actuates the first combustion chamber to provide inflation fluid to the primary chamber so that the inflation fluid flows from the primary chamber to the secondary chamber at a first flow rate. When the controller detects the occurrence of an event for which a more rapid inflation of the secondary chamber is desired, the second combustion chamber is actuated to provide inflation fluid to the primary chamber at the same time as the first combustion chamber so that the inflation fluid flows from the primary chamber to the secondary chamber at a second flow rate. The second flow rate is greater than the first flow rate.

According to another aspect, alone or in combination with any other aspect, the primary chamber, when inflated, is disposed directly forward of a vehicle seat in which the occupant is seated, and the secondary chamber, when inflated, is laterally inboard of the primary chamber.

According to another aspect, alone or in combination with any other aspect, the airbag is a passenger frontal airbag that is inflatable between an instrument panel of the vehicle and a passenger-side vehicle seat. The primary chamber, when inflated and deployed, covers a portion of the instrument panel that is presented in front of the passenger-side vehicle seat and spans at least substantially across the width of the passenger-side vehicle seat.

According to another aspect, alone or in combination with any other aspect, when the secondary chamber is inflated and deployed, the secondary chamber covers a portion of the instrument panel positioned laterally inboard of the primary chamber.

According to another aspect, alone or in combination with any other aspect, when the secondary chamber is inflated and deployed, the secondary chamber covers a portion of the instrument panel positioned laterally inboard of the passenger-side vehicle seat.

According to another aspect, alone or in combination with any other aspect, when the secondary chamber is inflated and deployed, the secondary chamber is configured to receive an occupant moving in an oblique direction in the vehicle.

According to another aspect, alone or in combination with any other aspect, the primary chamber has a total inflated volume that is greater than a total inflated volume of the secondary chamber.

According to another aspect, alone or in combination with any other aspect, both of the primary and secondary chambers are free from any vents for venting inflation fluid external to the airbag.

According to another aspect, alone or in combination with any other aspect, an airbag module includes the apparatus.

According to another aspect, alone or in combination with any other aspect, a vehicle safety system includes the airbag module.

According to another aspect, a method of protecting an occupant of a vehicle comprises providing the apparatus for helping to protect an occupant of a vehicle. The occurrence of an event for which inflation of the airbag is desired is detected. Once an event for which inflation of the airbag is desired has been detected, the inflator is actuated to provide inflation fluid to the primary chamber to inflate and deploy the primary chamber. Inflation fluid is directed from the primary chamber into the secondary chamber through the at least one passive vent to inflate and deploy the secondary chamber. The occurrence of an event for which a more rapid inflation of the secondary chamber is desired is detected. If an event for which a more rapid inflation of the secondary chamber is desired is detected, the active vent is actuated to direct inflation fluid from the primary chamber to the secondary chamber at the same time as the at least one passive vent directs inflation fluid from the primary chamber into the secondary chamber to inflate and deploy the secondary chamber.

According to another aspect, alone or in combination with any other aspect, the inflator is a dual-stage inflator having first and second combustion chambers. Each of the first and second combustion chambers has at least one exhaust port. The exhaust ports of the first and second combustion chambers are configured to provide inflation fluid to the primary chamber. The method further comprises once an event for which inflation of the airbag is desired has been detected, the first combustion is actuated to provide inflation fluid to the primary chamber to inflate and deploy the primary chamber. If an event for which a more rapid inflation of the secondary chamber is desired is detected, the second combustion chamber is actuated to provide inflation fluid to the primary chamber to inflate and deploy the primary chamber at the same time as the first combustion chamber provides inflation fluid to the primary chamber to inflate and deploy the primary chamber.

According to another aspect, alone or in combination with any other aspect, the apparatus further comprises a controller configured to actuate the inflator and the actuatable vent in response to sensed conditions. The controller is configured to actuate the inflator in response to detecting the occurrence of an event for which inflation of the airbag is desired. The controller is configured to selectively actuate the active vent in response to detecting the occurrence of an event for which a more rapid inflation of the secondary chamber is desired. A tether via which the active vent can be maintained in a closed position acts on the active vent. A release device is selectively releasably connected to the tether. The release device is in electric communication with the controller. The method further comprises utilizing the controller to detect the occurrence of an event for which inflation of the airbag is desired. Once an event for which inflation of the airbag is desired has been detected, the controller is utilized to actuate the inflator to provide inflation fluid to the primary chamber to inflate and deploy the primary chamber. The controller is utilized to detect the occurrence of an event for which a more rapid inflation of the secondary chamber is desired. If an event for which a more rapid inflation of the secondary chamber is desired is detected, the controller is utilized to actuate the release device. The actuation of the release device releases the connection between the release device and the tether so that the active vent is moved to an opened position to direct inflation fluid from the primary chamber to the secondary chamber.

DRAWINGS

The foregoing and other features of the present invention will become apparent to one skilled in the art to which the present invention relates upon consideration of the following description of the invention with reference to the accompanying drawings, in which.

DETAILED DESCRIPTION

Figure 1:
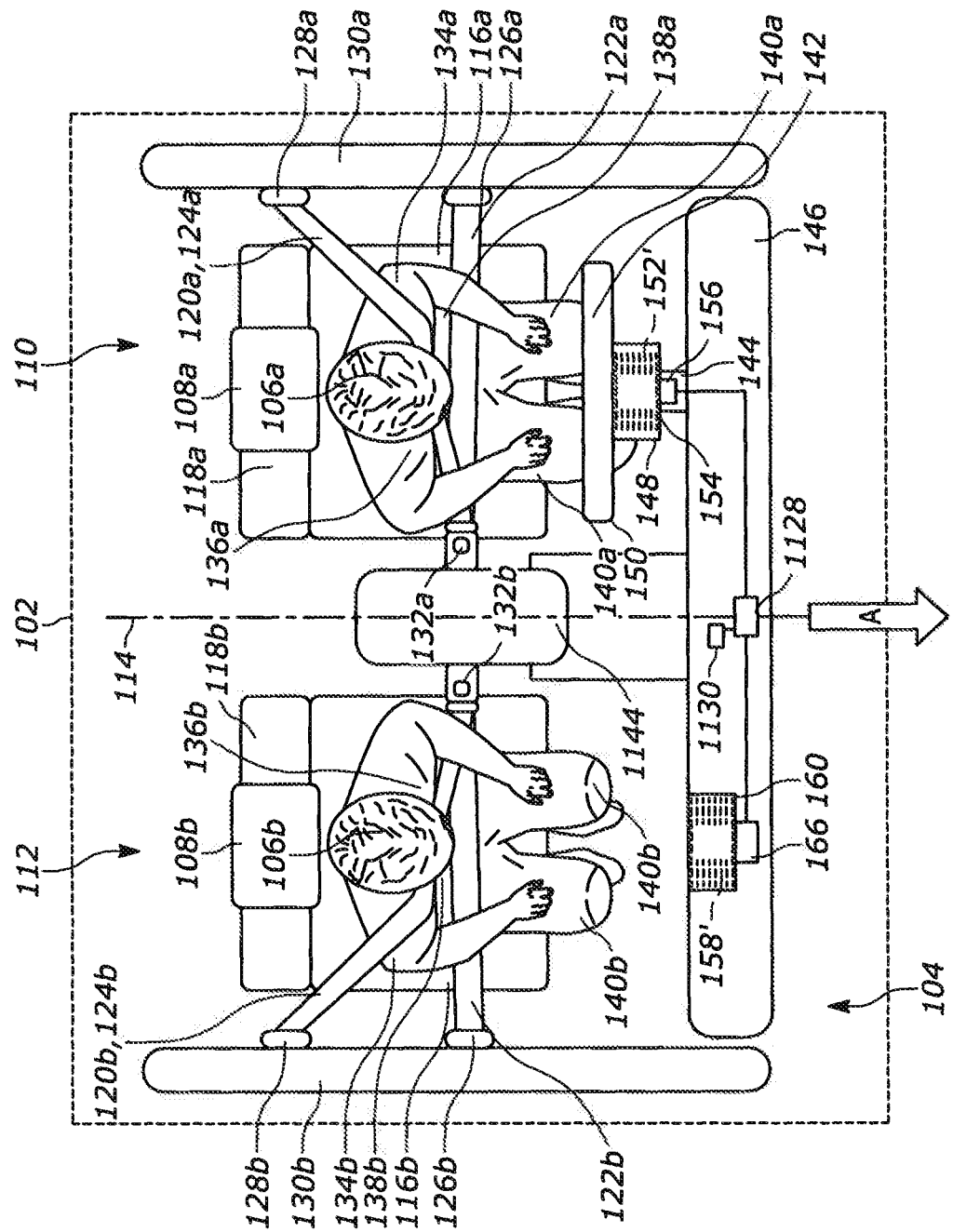
FIG. 1 is a schematic illustration of a vehicle including a safety system for helping to protect an occupant of the vehicle, according to one example configuration.
Figure 2:
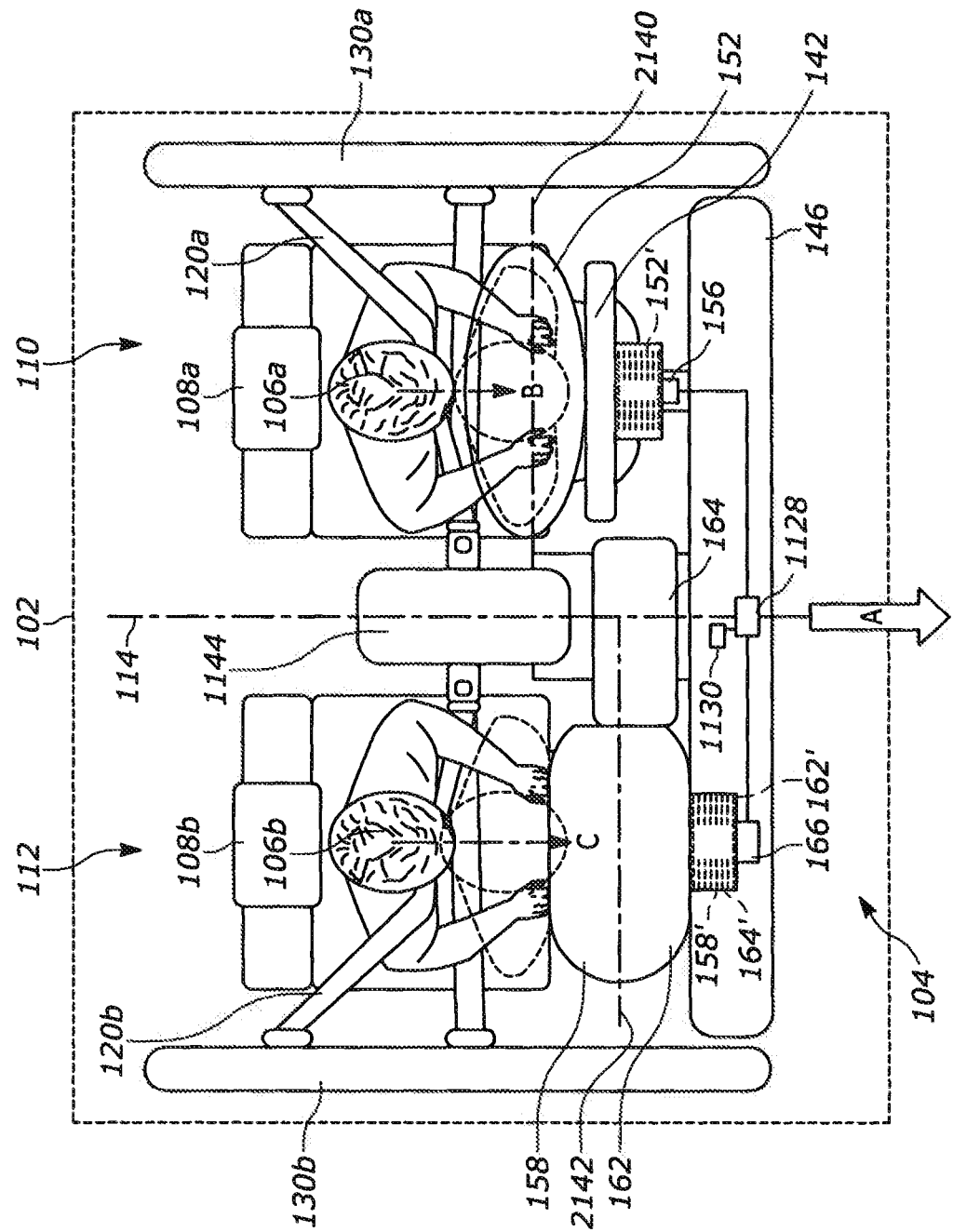
FIG. 2 is a schematic illustration of the vehicle safety system of FIG. 1 in a deployed condition and illustrating vehicle occupant movements in response to a crash scenario.
Figure 3:
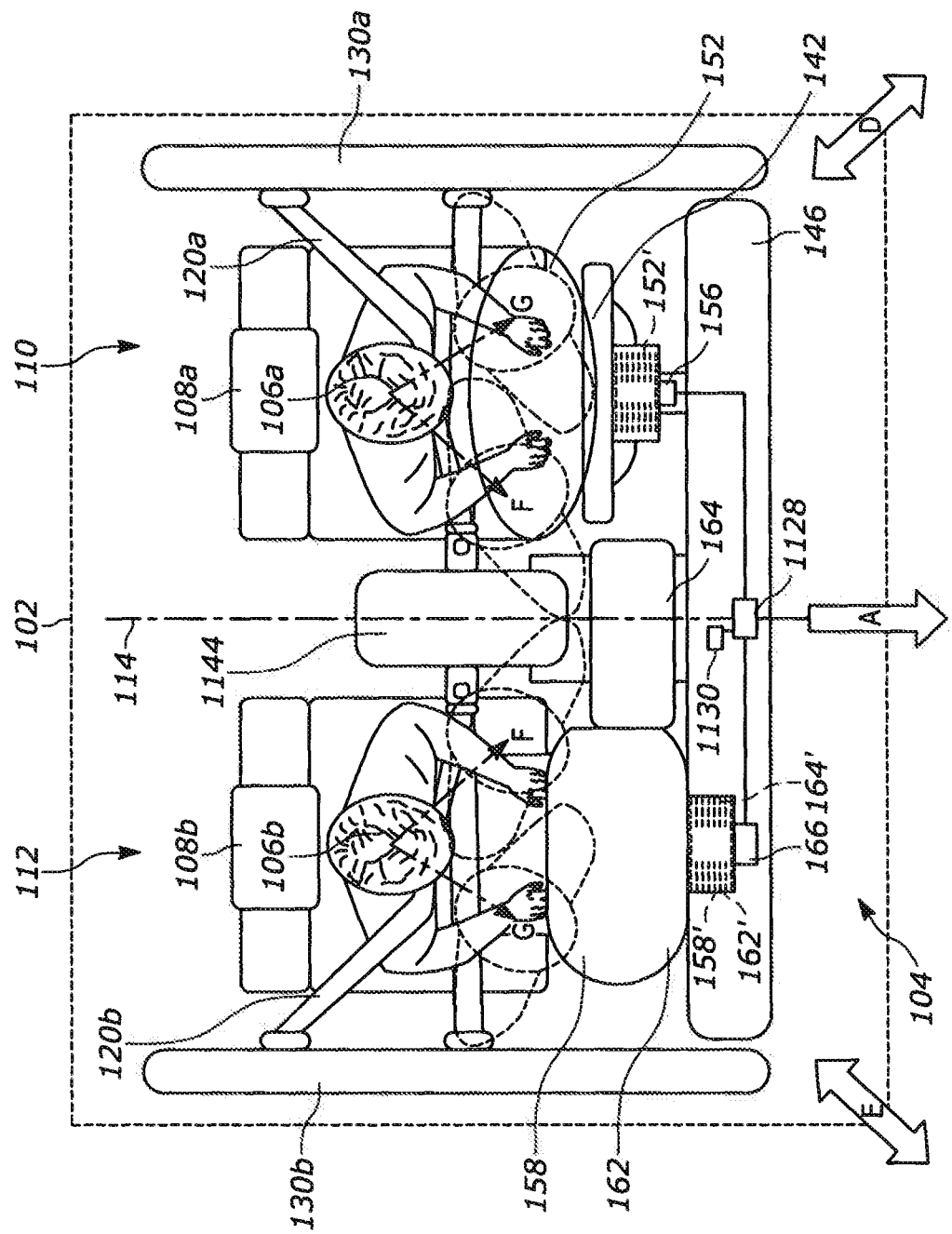
FIG. 3 is a schematic illustration of the vehicle safety system of FIG. 1 in a deployed condition and illustrating vehicle occupant movements in response to different crash scenarios.

The invention relates to an apparatus, such as an airbag, that helps protect an occupant of a vehicle in the event of an oblique collision. Referring to FIGS. 1-3, a vehicle 102 includes the apparatus, in the form of a vehicle safety system 104, for helping to protect occupants 106 of front vehicle seats 108 of the vehicle. More specifically, the vehicle safety system 104 helps protect the occupant 106a of a front vehicle seat 108a on a driver side 110 of the vehicle 102, and the occupant 106b of a front vehicle seat 108b on a passenger side 112 of the vehicle. In this description, these occupants 106 are referred to as a diver 106a and a passenger 106b.

The driver side 110 and passenger side 112 of the vehicle 102 are positioned on opposite sides of a vehicle centerline 114 of the vehicle. The driver side 110 is the side from which the driver 106a controls or operates the vehicle 102. In the illustrations of FIGS. 1-3, the driver side 110 is the side of the vehicle 102 to the left of the vehicle centerline 114, as viewed from the perspective of the occupants 106a, 106b in a normally seated position (as shown) and looking in the direction of forward vehicle travel, as indicated generally by the arrow labeled A. Those skilled in the art will appreciate that in some countries, such as England, the driver side 110 of the vehicle 102 can be opposite of that illustrated in FIGS. 1-3. Those skilled in the art will further appreciate that all of the features of the vehicle safety system 104 described herein are equally applicable to vehicles having this "right side driver" configuration.

Each vehicle seat 108a, 108b includes a vehicle seat base or bottom 116a, 116b and a seat back 118a, 118b. The vehicle safety system 104 includes seatbelts 120a, 120b for helping to restrain the occupants 106a, 106b in the seats 108a, 108b. Each seatbelt 120a, 120b includes a lap belt portion 122a, 122b and a shoulder belt portion 124a, 124b. Each seatbelt 120a, 120b has a first end connected to the vehicle 102 at an anchor point 126a, 126b located outboard of its associated vehicle seat bottom 116a, 116b. Each seatbelt 120a, 120b has an opposite second end connected to a retractor 128a, 128b connected to a side structure 130a, 130b of the vehicle 102, such as a B-pillar, at a location generally at or above and outboard of an upper extent of the associated seat back 118a, 118b.

Between the anchor point 126a, 126b and the retractor 128a, 128b, each seatbelt extends through a buckle 132a, 132b that is detachably anchored to the vehicle 102 on an inboard side of the associated seat bottom 116a, 116b. Each shoulder belt portion 124a, 124b extends from the retractor 128a, 128b, over the occupant's 106a, 106b outboard shoulder 134a, 134b, and across the torso 136a, 136b to the buckle 132a, 132b located in the region adjacent the occupant's hip 138a, 138b. The lap belt portion 122a, 122b extends from the buckle 132a, 132b, across the occupant's lap, i.e., the hips 138a, 138b and legs 140a, 140b, to the anchor point 126a, 126b.

The vehicle 102 includes a steering wheel 142 that is connected to a steering column 144 extending from an instrument panel 146 of the vehicle. The steering wheel 142 includes a central hub 148 and a rim 150 that encircles the hub. The occupant 106a can grasp the rim 150 to manipulate the steering wheel 142 to steer the vehicle 102 in a known manner.

The vehicle safety system 104 also includes a driver frontal airbag 152 that is mounted in a first housing 154 formed in the central hub 148. The driver frontal airbag 152 has a stored condition, illustrated in dashed lines at 152' in FIGS. 1-2, in which the airbag is folded, rolled, or otherwise placed within the first housing 154 in the central hub 148. The driver frontal airbag 152 is inflatable from the stored condition (dashed lines at 152') to the deployed condition (solid lines at 152) as shown in FIG. 2. The vehicle safety system 104 includes a first inflator 156 that is actuatable to produce inflation fluid for inflating the driver frontal airbag 152 in any known manner.

The vehicle safety system 104 also includes a passenger frontal airbag 158 that is mounted in a second housing 160 formed in the instrument panel 146. The passenger frontal airbag 158 has a stored condition, illustrated in dashed lines at 158' in FIGS. 1-2, in which the airbag is folded, rolled, or otherwise placed within the second housing 160 in the instrument panel 146. The passenger frontal airbag 158 is inflatable from the stored condition (dashed lines at 158') to the deployed condition (solid lines at 158) as shown in FIG. 2. As shown, the passenger frontal airbag 158 is inflatable between the instrument panel 146 and the passenger-side 112 vehicle seat 108b. The passenger frontal airbag 158 includes a primary chamber 162 and a secondary chamber 164 (FIGS. 2-3). The vehicle safety system 104 includes a second inflator 166 that is actuatable to produce inflation fluid for inflating the passenger frontal airbag 158 in any known manner.

Each of the driver and passenger frontal airbags 152, 158 can be constructed of any suitable material, such as nylon (e.g., woven nylon 6-6 yarns), and can be constructed in any suitable manner. For example, the driver and passenger frontal airbags 152, 158 can include one or more pieces or panels of material. If more than one piece or panel is used, the pieces or panels can be interconnected by known means, such as stitching, ultrasonic welding, heat bonding, or adhesives, to form the driver and passenger frontal airbags 152, 158. The driver and passenger frontal airbags 152, 158 can be uncoated, coated with a material, such as a gas impermeable urethane, or laminated with a material, such as a gas impermeable film. The driver and passenger frontal airbags 152, 158 thus can have a gas-tight or substantially gas-tight construction. Those skilled in the art will appreciate that alternative materials, such as polyester yarn, and alternatives coatings, such as silicone, can also be used to construct the driver and passenger frontal airbags 152, 158.

In the deployed condition, the driver frontal airbag 152 covers the steering wheel 142 and helps protect the driver 106a from impacts with the steering wheel by cushioning impacts with the occupant and helping to provide a controlled deceleration or "ride down" effect. Because the steering wheel 142 is rotated during vehicle operation, the shape of the driver frontal airbag 152 is round (as viewed from the occupant's perspective) and generally centered on the steering wheel axis of rotation. This way, the driver frontal airbag 152 provides the same degree of coverage regardless of the rotational position of the steering wheel 142 at the time of deployment.

In the deployed condition, the primary chamber 162 of the passenger frontal airbag 158 covers a portion of the vehicle 102 and helps to provide protection from impacts with the covered portion of the vehicle. In particular, in the example configuration depicted in FIGS. 2-3, when inflated and in the deployed condition, the primary chamber 162 of the passenger frontal airbag 158 is disposed directly forward (as viewed in the direction of arrow A) of the vehicle seat 108*b* in which the passenger 106*b* is seated. The primary chamber 162 covers the portions of the instrument panel 146 presented in front of the passenger-side vehicle seat 108*b* and spans substantially across the width of the passenger-side vehicle seat. The primary chamber 162 of the passenger frontal airbag 158 helps protect the passenger 106*b* from impacts with the instrument panel 146 by cushioning impacts with the occupant and helping to provide a controlled deceleration or "ride down" effect. Because the passenger 106*b* is not charged with operating the vehicle 102, his or her position in the passenger-side vehicle seat 108*b* can vary. As a result, the primary chamber 162 of the passenger frontal airbag 158 is configured to cover a large area of the instrument panel 146.

Referring to FIGS. 2-3, the passenger frontal airbag 158 also includes a secondary chamber 164 for helping to protect occupants 106*a*, 106*b* in the event of at least one of an offset and oblique crash event. The secondary chamber 164 is attached to the primary chamber 162. The secondary chamber 164 has a stored condition and is inflatable to a deployed condition to cover portions of the vehicle 102 left uncovered by the primary chamber 162. The secondary chamber 164 thus supplements the protection afforded by the primary chamber 162 by extending its lateral coverage of the vehicle 102. The secondary chamber 164 is connected to the primary chamber 162 in a manner such that their respective inflatable volumes are fluidly connected with each other. In this manner, the second inflator 166 is actuatable to provide the inflation fluid for inflating both the primary chamber 162 and the secondary chamber 164. The primary chamber 162 and the secondary chamber 164 can thus be deployed simultaneously, or substantially simultaneously, given that inflation fluid entering the secondary chamber would first pass through the primary chamber.

The secondary chamber 164, when inflated and in the deployed condition, extends laterally inboard from the primary chamber 162 toward and even beyond the vehicle centerline 114. In other words, when the secondary chamber 164 is inflated and deployed, the secondary chamber covers a portion of the instrument panel 146 position laterally inboard of at least one of the primary chamber 162 and the passenger-side vehicle seat 108*b*. The secondary chamber 164 can be positioned adjacent, touching, or near the instrument panel 146 and can be configured to receive an occupant 106 moving in an oblique direction in the vehicle 102. Thus, the secondary chamber 164 can be configured to cover a portion of the instrument panel 146 where an occupant 106 could strike in the event of an oblique and/or offset collision.

The configuration of the primary and secondary chambers 162, 164, and the portions of the vehicle (instrument panel 146, etc.) that they cover, can vary depending on the architecture of the vehicle 102 in which it is installed. In the embodiment of FIGS. 1-3, the primary and secondary chambers 162, 164 have a generally rectangular configuration with the primary chamber having a total inflated volume that is greater than a total inflated volume of the secondary chamber. The configuration of the primary and secondary chambers 162, 164 could, however, differ.

Figure 4:
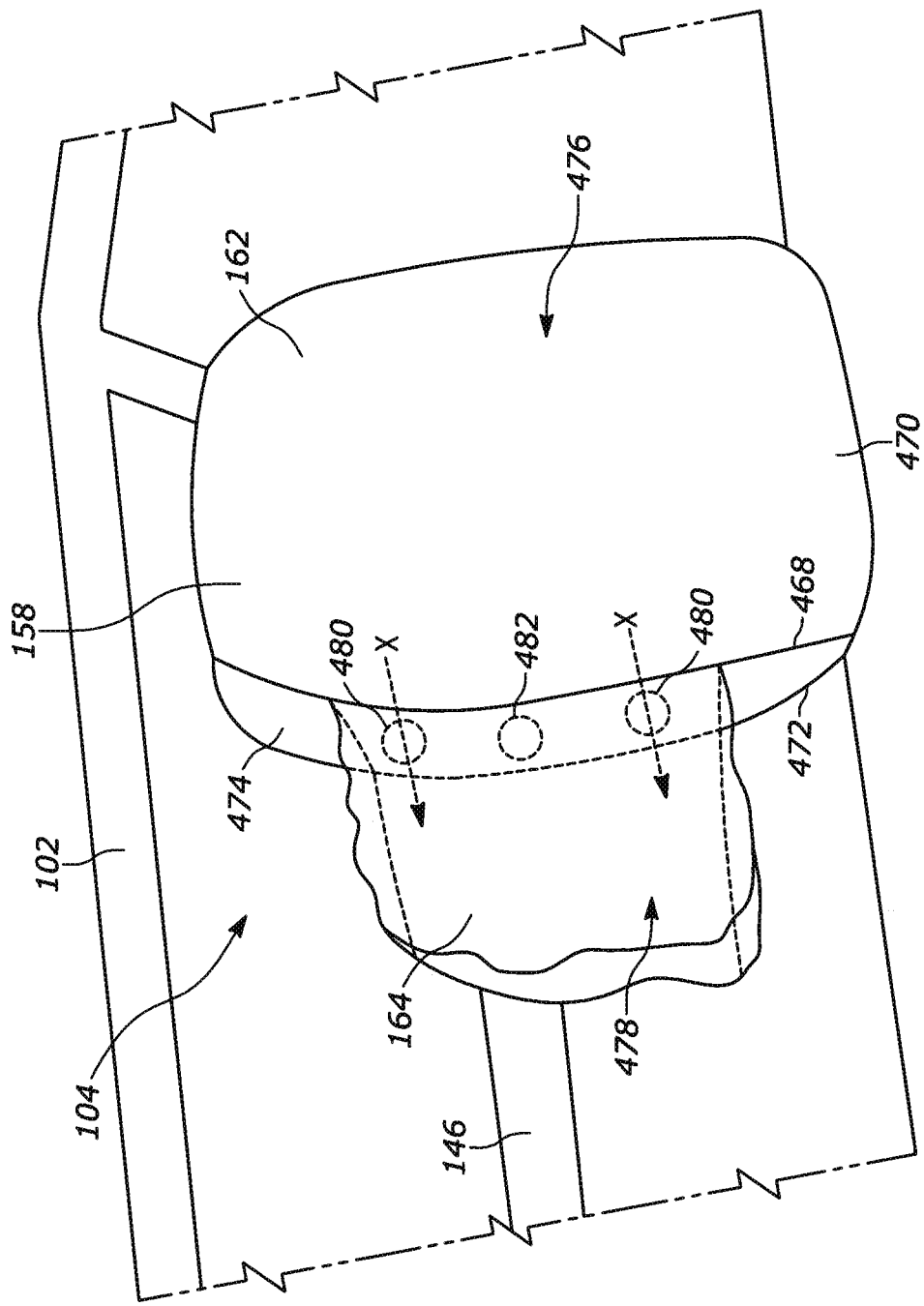
FIGS. 4-5 are a perspective illustration of a portion of the vehicle safety system.

An example configuration of a portion of the passenger frontal airbag 158 of the vehicle safety system 104 is illustrated in FIG. 4. The configurations of the primary chamber 162 and the secondary chamber 164 of the passenger front airbag 158 illustrated in FIG. 4 are not, however, meant to limit the use of the secondary chamber to the illustrated configuration nor to exclude use of the secondary chamber from other frontal airbag configurations. In fact, the secondary chamber 164 can be implemented in any airbag in which auxiliary coverage/protection is desired. For example, although the secondary chamber 164 is shown and described as being attached to the primary chamber 162 of the passenger frontal airbag 158 in order to supplement the protection afforded by the passenger frontal airbag, the secondary chamber 164 may be attached to, and supplement the projection afforded by any conventional airbag structure, such as, but not limited to, the driver frontal airbag 152, any frontal airbag, a door-mounted side impact airbag, a seat-mounted side impact airbag, a pillar airbag, a curtain airbag, a frontal airbag for rear seat occupants, a knee bolster, or an inflatable seatbelt.

Figure 5:
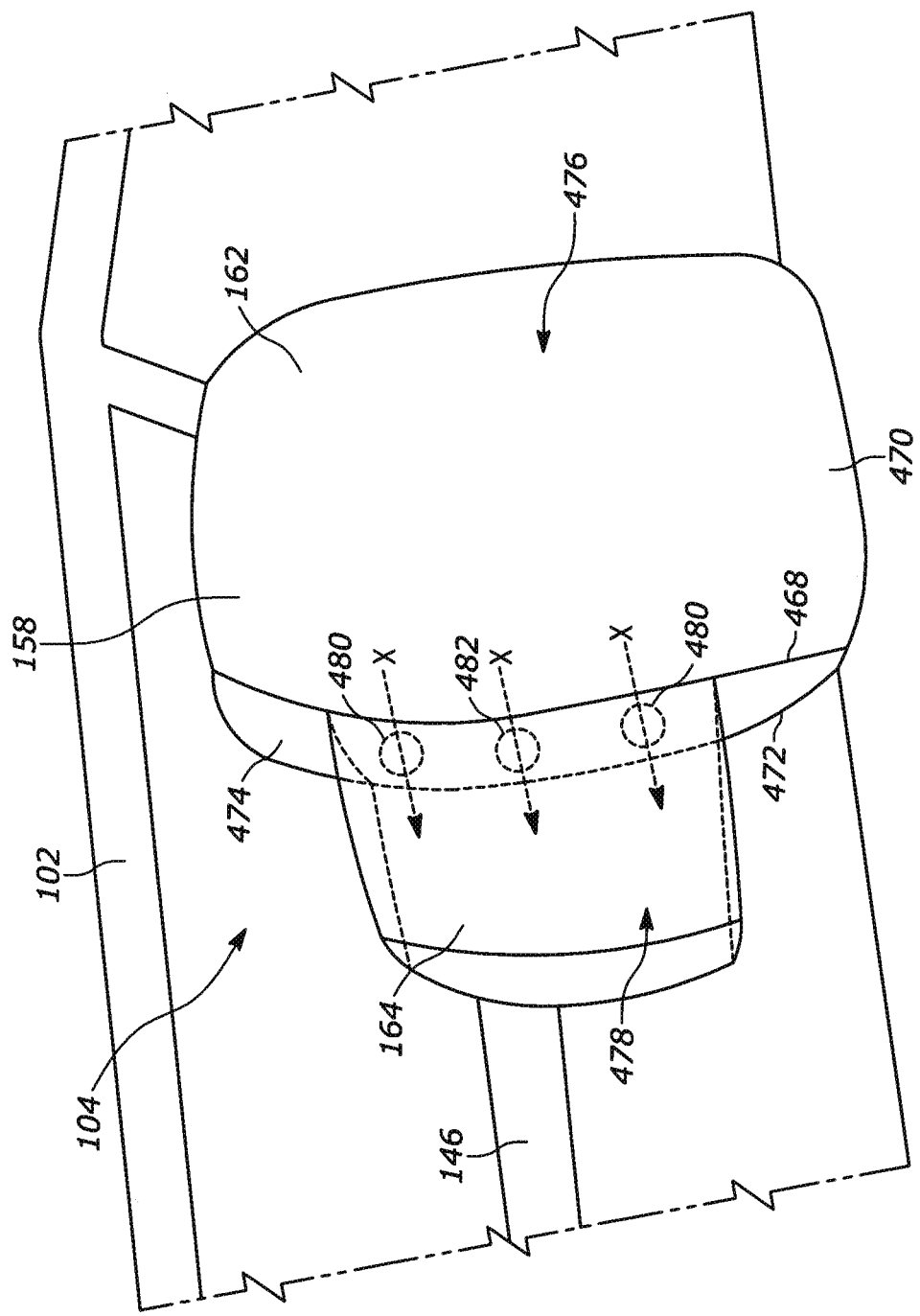

In the example configuration depicted in FIGS. 4-5, the primary chamber 162 of the passenger frontal airbag 158 has a generally rectangular configuration. A side seam 468 interconnects front and rear panels 470, 472 of the primary chamber 162 along a periphery of the primary chamber. The secondary chamber 164 can be connected to the primary chamber 162 at or near a side wall 474 that separates the primary and secondary chambers, by connections such as stitching, ultrasonic welding, and adhesive bonding. The connection of the secondary chamber 164 to the primary chamber 162 is configured such that the inflatable volume 478 of the secondary chamber and an inflatable volume 476 of the primary chamber are fluidly connected. The secondary chamber 164 receives inflation fluid from the primary airbag 162, which receives inflation fluid from the second inflator 166. Both of the primary and secondary chambers 162, 164 may be free from any vents for venting inflation fluid external to the passenger frontal airbag 158. Thus, any inflation fluid provided to the primary chamber 162 either remains in the primary chamber or is recycled into the secondary chamber 164.

In the example configurations of FIGS. 4-5, at least one passive vent 480 is disposed in the side wall 474 that separates the primary and secondary chambers 162, 164 provides at least a portion of the fluid communication between the primary and secondary chambers. In other words, the at least one passive vent 480 is configured to direct inflation fluid from the primary chamber 162 to the secondary chamber 164. In some example configurations, the at least one passive vent 480 may allow for the free flow of inflation fluid in both directions. In other example configurations, the at least one passive vent 480 may be one-directional (e.g., allowing inflation fluid flow from the primary chamber 162 to the secondary chamber 164, but not from the secondary chamber to the primary chamber).

Further, at least one active vent 482 is disposed in the side wall 474 that separates the primary and secondary chambers 162, 164 is actuatable to provide at least a portion of the fluid communication between the primary and secondary chambers. In other words, the at least one active vent 482 is actuatable from a closed position (FIG. 4) to an opened position (FIG. 5) to direct inflation fluid from the primary chamber 162 to the secondary chamber 164. In some example configurations, the at least one active vent 482, when in the opened position, may allow for the free flow of inflation fluid in both directions. In other example configurations, the at least one active vent 482, when in the opened position, may be one-directional (e.g., allowing inflation fluid flow from the primary chamber 162 to the secondary chamber 164, but not from the secondary chamber to the primary chamber).

FIGS. 4-5 depict the inflation and deployment of the passenger frontal airbag 158 at similar predetermined points in time upon activation of the second inflator 166. FIG. 4, however, depicts a situation where the active vent 482 is not actuated, and thus in the closed position. As can be seen, when the active vent 482 is in the closed position, only the at least one passive vent 480 (shown here as two passive vents) directs inflation fluid from the primary chamber 162 to the secondary chamber 164 upon the activation of the second inflator 166, as shown by arrows X in FIG. 4. FIG. 5 depicts a situation where the active vent 482 is actuated, and thus, in the opened position. As can be seen, when the active vent 482 is in the opened position, the active vent and the at least one passive vent 480 direct inflation fluid from the primary chamber 162 to the secondary chamber 164 upon the activation of the second inflator 166. A flow rate of the inflation fluid flowing from the primary chamber 162 into the secondary chamber 164 when the active vent 482 is actuated is greater than a flow rate of the inflation fluid flowing from the primary chamber to the secondary chamber when the active vent is not actuated due to the inflation fluid having at least one more vent to flow through. The increase in flow rate allows the secondary chamber 164 to inflate to the deployed position faster when the active vent 482 is actuated than when the active vent is not actuated, as can be seen in FIGS. 4-5 depicting the inflation of passenger frontal airbag 158 at similar points in time after the actuation of the second inflator 166.

Because the flow rate between the primary chamber 162 and the secondary chamber 164 is increased when the active vent 482 is actuated, the active vent is configured to be actuated in response to detecting an occurrence of an event for which a more rapid inflation of the secondary chamber is desired. The occurrence of an event for which a more rapid inflation of the secondary chamber 164 is desired can be at least one of an offset collision event and an oblique collision event. Thus, if at the time of a collision event it is determined that the collision event is at least one of an offset collision and an oblique collision, the active vent 482 is actuated to move the active vent from the closed position to the opened position so that the active vent and the at least one passive vent 480 directs inflation fluid from the primary chamber 162 to the secondary chamber 164. However, if at the time of a collision event it is determined that the collision event is not at least one of an offset collision and an oblique collision, the active vent 482 is not actuated so that the active vent remains in the closed position and the at least one passive vent 480 directs inflation fluid from the primary chamber 162 to the secondary chamber 164.

Figure 6:
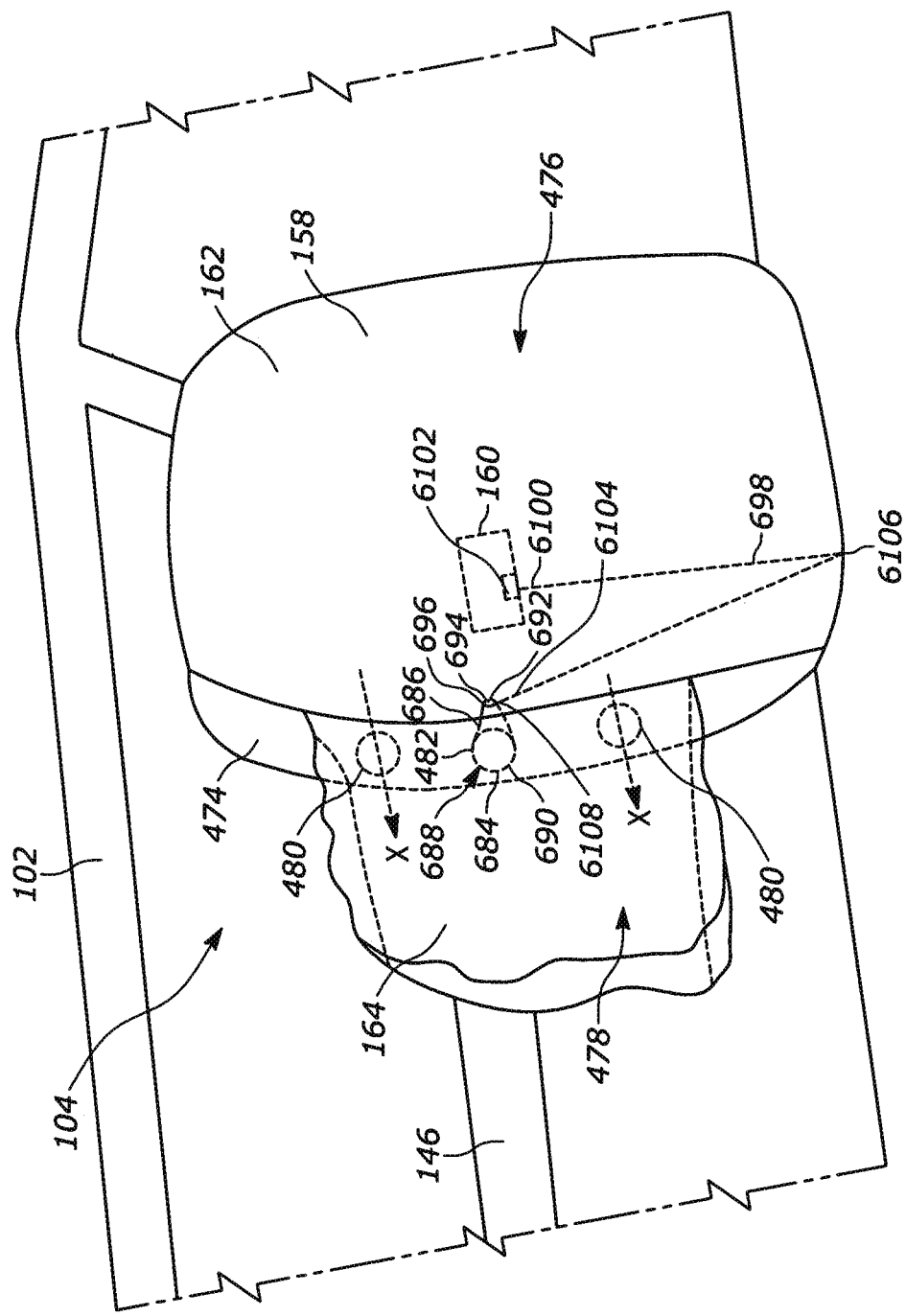
FIGS. 6-7 are perspective illustrations of a portion of the vehicle safety system, with an element in a first example configuration.
Figure 7:
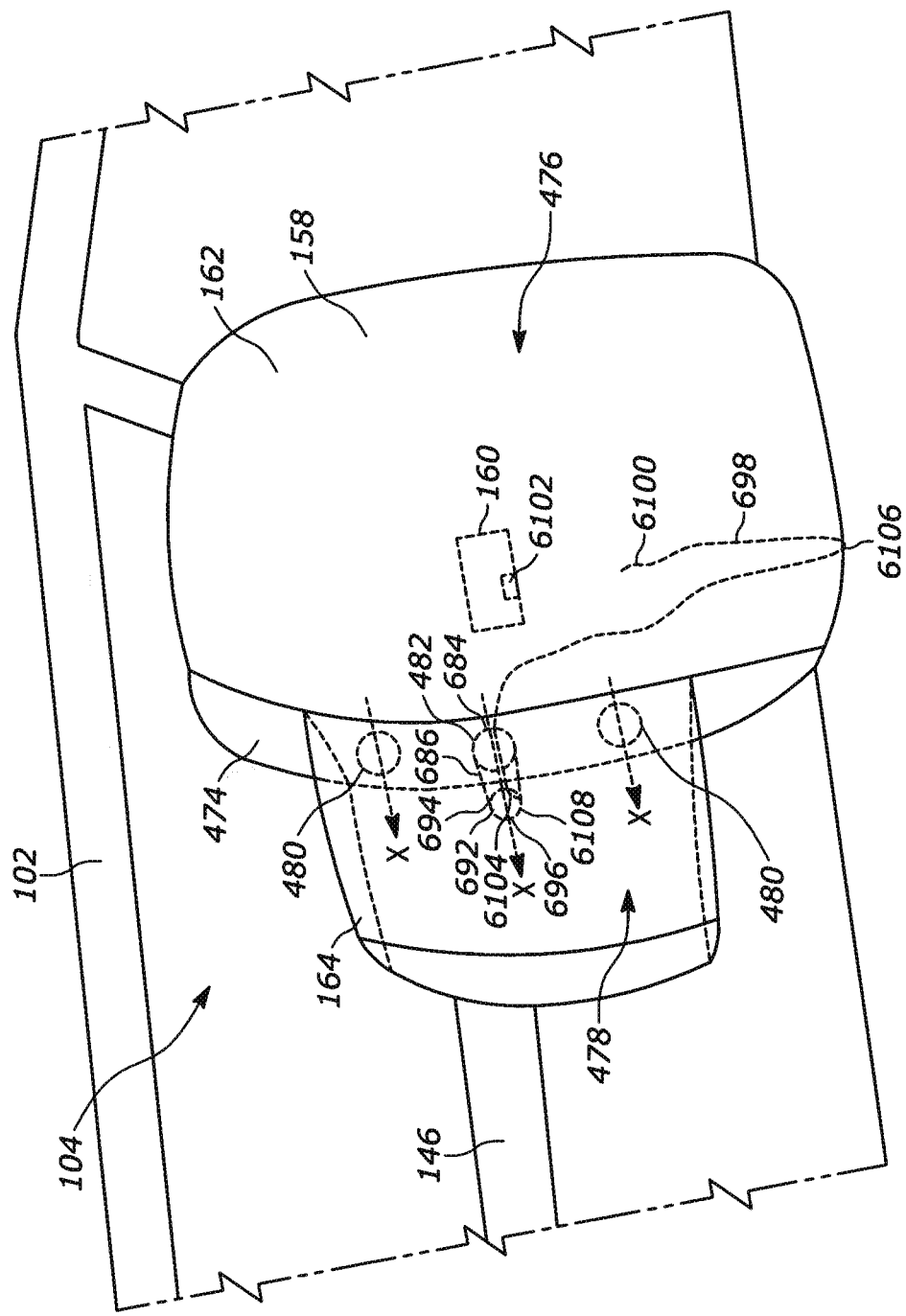

FIGS. 6-7 depict an example configuration for the active vent 482. The active vent 482 in the configuration of FIGS. 6-7, includes a vent opening 684, such as a slit or hole, that extends through the side wall 474 that separates the primary chamber 162 from the secondary chamber 164. As shown in FIGS. 6-7, the vent opening 684 has a generally circular shape or configuration. Those skilled in the art, however, will appreciate that the vent opening 684 may have any desired shape or configuration.

The active vent 482 includes an annular or tube-shaped piece of material 686 that overlies a portion 688 of the airbag material extending around a periphery 690 of the vent opening 684. The piece 686 includes a central opening 692 that coincides with the vent opening 684 when the piece 686 is connected to the portion 688 of the side wall 474. The piece 686 and portion 688 are interconnected by known means, such as stitching, ultrasonic welding, heat bonding, or adhesives. The piece of material 686 includes a rim 694 opposite to the portion of the material that is connected to the portion 688 of the side wall 474. The rim 694 has a passage or channel 696 that extends circumferentially about the rim.

The vehicle safety system 104 also includes a tether 698 for actuating the active vent 482. In the embodiment illustrated in FIGS. 6-7, the tether 698 is positioned inside the primary chamber 162, i.e., in the inflatable volume 476 of the primary chamber. The tether 698 has a first end portion 6100 that is selectively releasably connected to a release device 6102 by known means. The release device 6102 can be positioned within any part of the vehicle 102, such as in the second housing 160. The release device 6102 may, for example, be an actuatable fastener, such as a pyrotechnic bolt, that is actuatable to break or release the connection of the release device to the first end portion 6100 of the tether 698. Those skilled in the art will appreciate that alternative release devices 6102 could be utilized. For example, the release device 6102 may comprise an actuatable latch, a solenoid mechanism, or actuatable cutters or shears. A second end portion 6104 of the tether 698, opposite the first end portion 6100, is associated with the active vent 482. The tether 698 can have a deflection 6106 at a location between the release mechanism 6102 and the active vent 482, such as at a lower end of the primary chamber 162.

The tether 698 may be constructed of any material suited to perform the functions described herein. For example, in one particular construction, the tether 698 may comprise a narrow, elongated strip of fabric material, such as a woven nylon webbing. The tether 698 may also have any configuration suited to perform the functions described herein. For example, in one particular configuration, the tether 698 may have a width of approximately three-eighths of an inch, a thickness of approximately two millimeters, and a length dependent upon the configuration of the primary chamber 162, the configuration of the vehicle 102, or both.

The second end portion 6104 of the tether 698 is configured to form a loop 6108 that enters the channel 696. The loop 6108 extends at least partially through the channel 696 and thus at least partially encircles or surrounds the rim 694. The loop 6108 is configured to have a size or diameter that reduces or constricts in response to tension forces applied to the tether 698 in a manner similar or identical to a slip knot or noose. As described below, the looped configuration of the tether 698 acts as a drawstring for drawing closed the vent opening 684. The loop 6108 may be formed in any manner suited to achieve this function.

Configured as described above, the tether 698 cooperates with the channel 696 to serve as a drawstring that closes the active vent 482, i.e., the vent opening 684, when the tether is tensioned. When the tether 698 is tensioned, the size or circumference of the loop 6108 is reduced, which, because the loop extends through the channel 696, constricts or otherwise draws closed the vent opening 684. The tension applied to the tether 698 may thus maintain the active vent 482 in the closed position.

By actuating the active vent 482 to the "closed" condition, it is meant that the size of the vent opening 684 is reduced to a degree sufficient to stop or reduce the flow of inflation fluid through the active vent. Those skilled in the art will appreciate that the active vent 482, when in the closed condition, may still permit some degree of inflation fluid flow. The degree of inflation fluid flow through the active vent 482 when in the closed condition is, however, less or substantially less than the degree of inflation fluid flow through the active vent when in the opened condition.

As shown in FIG. 6, the tether 698, when tensioned, holds the active vent 482 in the closed condition. When this occurs, the looped second end portion 6104 of the tether 698 draws closed the vent opening 684, as described above. This helps block inflation fluid flow through the active vent 482 from the primary chamber 162 to the secondary chamber 164.

When an occurrence of an event for which inflation of the passenger frontal airbag 158 is desired, such as a collision event, the second inflator 166 is actuated to provide inflation fluid to the primary chamber 162. As the primary chamber 162 inflates, the tether 698 is tensioned. Thus, during an initial deployment phase of the passenger frontal airbag 158, the active vent 482 can be in the closed position. If it is determined that the collision event is not an event for which a more rapid inflation of the secondary chamber 164 is desired (e.g., determines that the collision event is not at least one of an offset and oblique collision event), the release device 6102 is not actuated to release the first end portion 6100 of the tether 698 so that the connection between the release device and tether is maintained. The maintenance of the connection between the release device 6102 and the tether 698 holds the active vent 482 in the closed position so that that the at least one passive vent 480 directs inflation fluid from the primary chamber 162 to the secondary chamber 164, as shown in FIG. 6. In other words, when the collision event is not at least one of an offset and oblique collision event, the active vent 482 is not actuated so that inflation fluid is not directed from the primary chamber 162 to the secondary chamber 164 through the active vent.

However, if it is determined that the collision event is an event for which a more rapid inflation of the secondary chamber 164 is desired (e.g., at least one of an offset and oblique collision event), the release device 6102 is actuated. The actuated release device 6102 releases the first end portion 6100 of the tether 698, and thus releases the connection between the release device and the tether. With the first end portion 6100 of the tether 698 released, the tension in the tether is removed and the active vent 482 is moved to the opened position, so that the active vent and the at least one passive vent 480 directs inflation fluid from the primary chamber 162 to the secondary chamber 164, as shown in FIG. 7. In other words, when the collision event is at least one of an offset and oblique collision event, the active vent 482 is actuated so that inflation fluid is directed from the primary chamber 162 to the secondary chamber 164 through the active vent.

The flow rate of the inflation fluid flowing from the primary chamber 162 into the secondary chamber 164 when the active vent 482 of the example configuration depicted in FIGS. 6-7 is actuated is greater than a flow rate of the inflation fluid flowing from the primary chamber to the secondary chamber when the active vent is not actuated due to the inflation fluid having at least one more vent to flow through. The increase in flow rate allows the secondary chamber 164 to inflate to the deployed position faster when the active vent 482 is actuated than when the active vent is not actuated, as can be seen in FIGS. 6-7 depicting the inflation of passenger frontal airbag 158 at similar points in time after the actuation of the second inflator 166.

Figure 8:
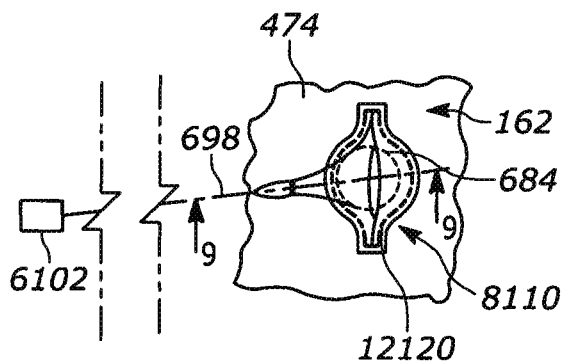
FIG. 8 depicts a schematic view of a portion of the vehicle safety system, with an element in a second example configuration and in a first use condition.

FIGS. 8-14 depict another example configuration of the active vent 482. The active vent 482 in the configuration of FIGS. 8-14 includes the vent opening 684, such as a slit or hole, that extends through the side wall 474 that separates the primary chamber 162 from the secondary chamber 164. As shown in FIG. 8, the vent opening 684 has a generally circular shape or configuration. Those skilled in the art, however, will appreciate that the vent opening 684 may have any desired shape or configuration. The vent opening 684 is covered by a separate closure element 8110 that is attached to the side wall 474, such as by sewing, welding, gluing, and/or weaving. The entire vent opening 684 in the side wall 474 is covered by the closure element 8110 as is evident from FIG. 8.

Figure 12:
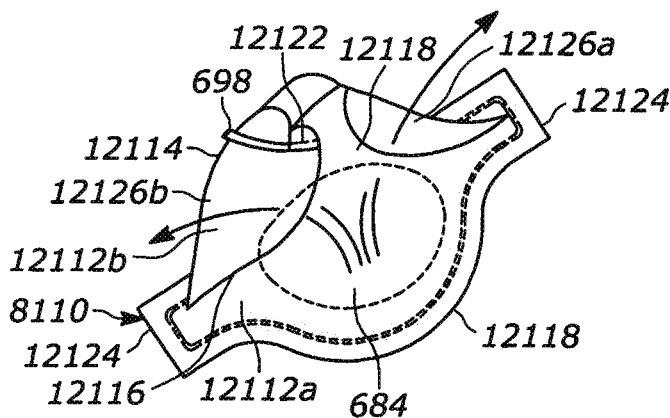
FIG. 12 is a schematic perspective view of an element of the aspect of FIG. 10.

The closure element 8110 is illustrated in detail in FIG. 12. In this case it is formed of two cut portions 12112a, 12112b each including a surface area delimited by a peripheral edge 12114 and by two side edges 12116 as well as an elongate end 12118 opposite to the peripheral edge 12114. In a top view, the cut portions 12112a, 12112b are approximately bell-shaped or club-shaped. The peripheral edge 12114 of each of the cut portions 12112a, 12112b is sewn up with the side wall 474 by means of a peripheral seam 12120.

At the elongate ends 12118 the two cut portions 12112a, 12112b are connected by means of a seam 12122. In this example, the two cut portions 12112a, 12112b are moreover sewn together at the two most external edge areas 12124 (FIG. 5) so that the closure element 8110 in total has a circumferential peripheral edge. Apart from said connections, the cut portions 12112a, 12112b are not fixed to each other so that the closure element 8110 is completely open above the vent opening 684 in the side wall 474. Likewise, sides 12116 between the edge area 12124 and the elongate ends 12118 are open so that two large lateral drop-shaped discharge orifices 12126a, 12126b are formed.

Figure 9:
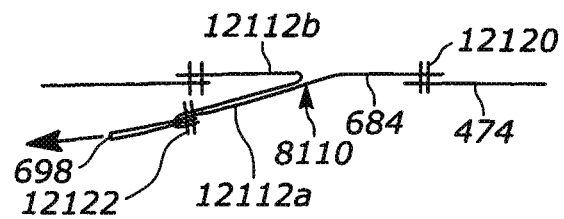
FIG. 9 is a schematic sectional view along the line 9-9 in FIG. 8.

The closure element 8110 may take a closed position as shown in FIGS. 8-9 in which it is folded into the interior of the primary chamber 162 and the discharge orifices 12126a, 12126b and thus the entire vent opening 684 is closed in a substantially gastight manner by the folded closure element.

Figure 10:
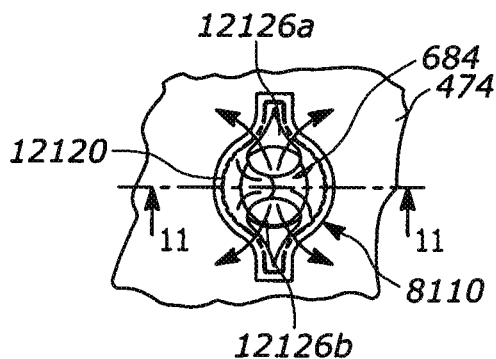
FIG. 10 depicts a schematic view of a portion of the vehicle safety system of FIG. 8 in a second use condition.
Figure 11:
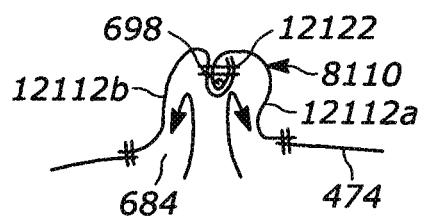
FIG. 11 is a schematic sectional view along the line 11-11 in FIG. 10.

In the opened position as illustrated in FIGS. 10-12, the closure element 8110 is everted out of the primary chamber 162, on the other hand, so that a perpendicularly outwardly projecting bulge is resulting which is substantially perpendicular to the side wall 474 in the surrounding of the vent opening 684. The closure element 8110 in its opened position resembles an outwardly tapered hollow which is cone-shaped, funnel-shaped or cap-shaped, for example.

In order to maintain the closure element 8110 in the closed position or bring the same into the closed position a tether 698 which at least initially is tightly fixed in the primary chamber 162 is attached to the elongate ends 12118 of the cut portions 12112a, 12112b of the closure element.

When tension is exerted on the tether 698, the closure element 8110 remains within the primary chamber 162 even with an increasing internal pressure of the primary chamber or is pulled into the primary chamber, if it is in the opened position. The tension exerted on the tether 698 moreover effectuates that the pressure of the inflation fluid does not evert the closure element 8110 outwardly but urges the same against the side wall 474 from inside the primary chamber 162 and hence closes or keeps the discharge orifices 12126a, 12126b closed.

In the embodiment shown in FIGS. 8-14 the tether 698 is connected to the release device 6102. The release device 6102 is configured such that it can selectively release the tether 698 initially connected thereto so that there is no more tension acting on the tether.

In a first possible method the closure element 8110 is housed in its closed position in the folded primary chamber 162. The tether 698 is arranged and dimensioned as to its length so that at the beginning of deployment of the primary chamber 162 sufficient tension acts on the tether so as to maintain the closure element 8110 in the closed position inside the primary chamber. In other words, during normal deployment of the primary chamber 162, the closure element 8110 remains in the closed position and the discharge orifices 12126a, 12126b remain closed due to the tensioned tether 698 so that through no inflation fluid escapes from the primary chamber through the active vent 482.

Figure 13:
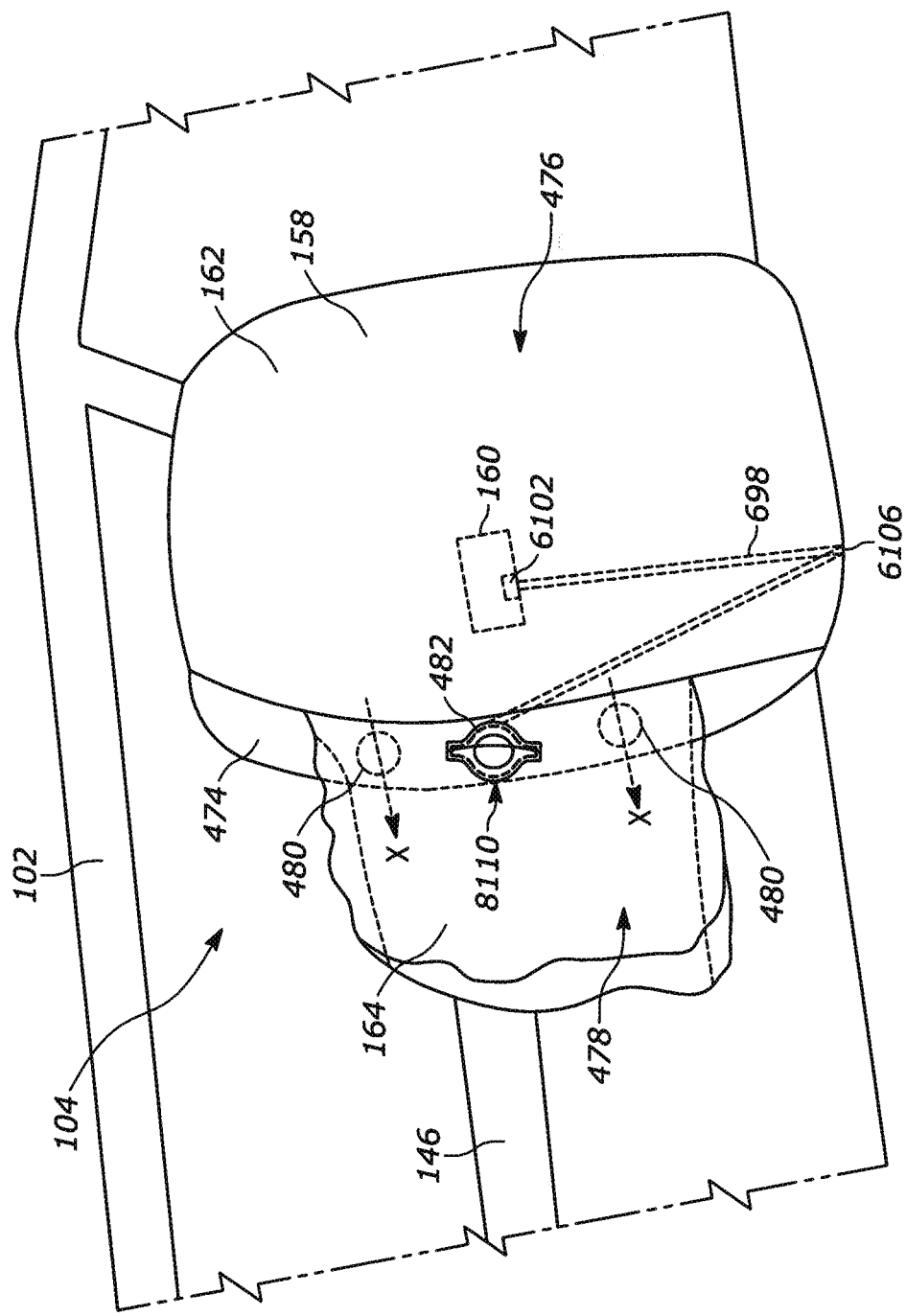
FIGS. 13-14 are schematic views of the vehicle safety system of the aspect of FIG. 18 in example use configurations.

When an occurrence of an event for which inflation of the passenger frontal airbag 158 is desired, such as a collision event, the second inflator 166 is actuated to provide inflation fluid to the primary chamber 162. As the primary chamber 162 inflates, the tether 698 is tensioned. Thus, during an initial deployment phase of the passenger frontal airbag 158, the active vent 482 can be in the closed position. If it is determined that the collision event is not an event for which a more rapid inflation of the secondary chamber 164 is desired (e.g., determines that the collision event is not at least one of an offset and oblique collision event), the release device 6102 is not actuated to release the tether 698 so that the connection between the release device and tether is maintained. The maintenance of the connection between the release device 6102 and the tether 698 holds the discharge orifices 12126a, 12126b, and thus the active vent 482, in the closed position so that that the at least one passive vent 480 directs inflation fluid from the primary chamber 162 to the secondary chamber 164, as shown in FIG. 13. In other words, when the collision event is not at least one of an offset and oblique collision event, the active vent 482 is not actuated so that inflation fluid is not directed from the primary chamber 162 to the secondary chamber 164 through the active vent.

Figure 14:
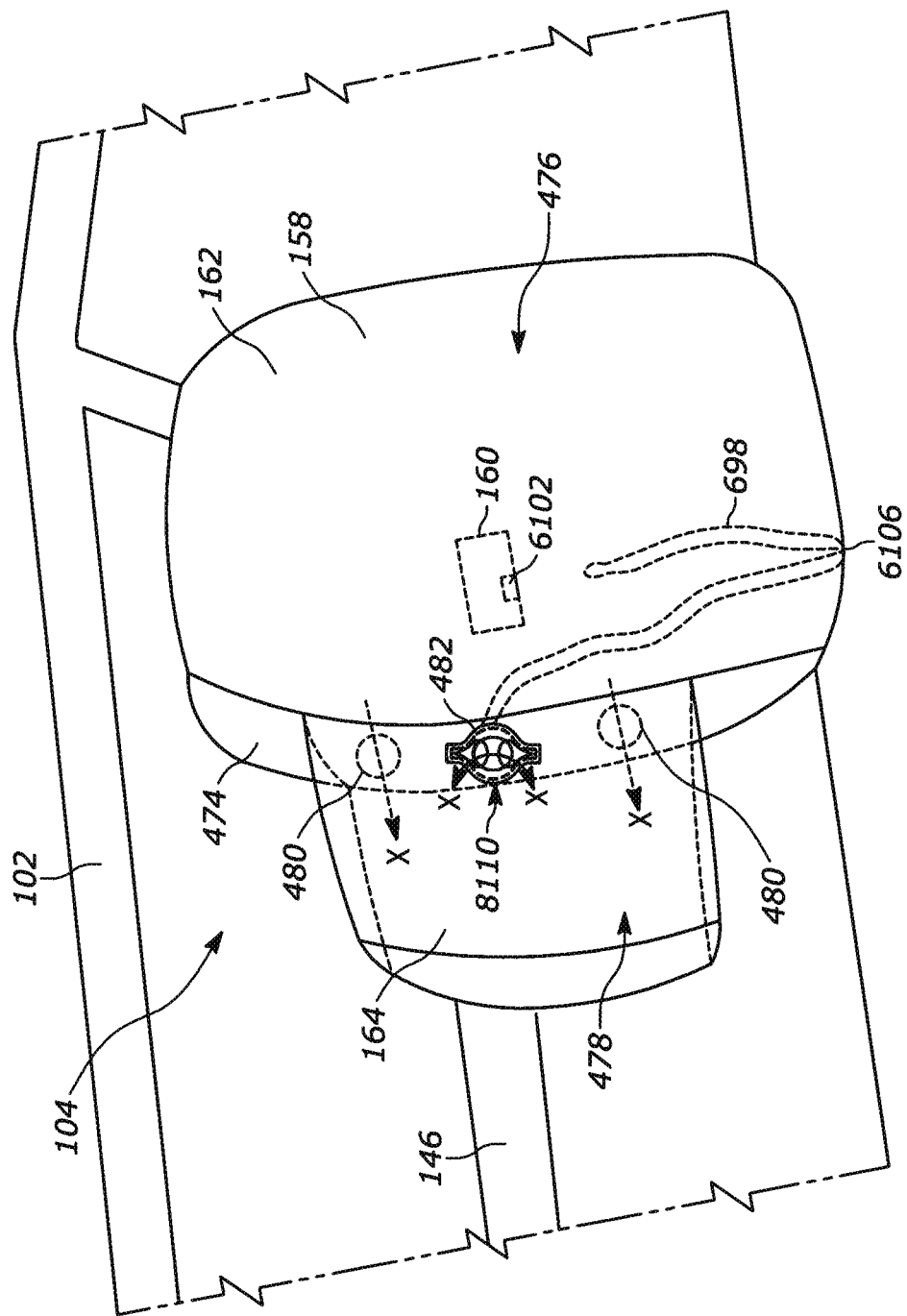

However, if it is determined that the collision event is an event for which a more rapid inflation of the secondary chamber 164 is desired, the release device 6102 is actuated. The actuated release device 6102 releases the tether 698, and thus releases the connection between the release device and the tether. With the tether 698 released, the tension in the tether is removed and discharge orifices 12126a, 12126b, and thus the active vent 482, is moved to the opened position, so that the active vent and the at least one passive vent 480 directs inflation fluid from the primary chamber 162 to the secondary chamber 164, as shown in FIG. 14. In other words, when the collision event is at least one of an offset and oblique collision event, the active vent 482 is actuated so that inflation fluid is directed from the primary chamber 162 to the secondary chamber 164 through the active vent.

The flow rate of the inflation fluid flowing from the primary chamber 162 into the secondary chamber 164 when the active vent 482 of the example configuration depicted in FIGS. 8-14 is actuated is greater than a flow rate of the inflation fluid flowing from the primary chamber to the secondary chamber when the active vent is not actuated due to the inflation fluid having at least one more vent to flow through. The increase in flow rate allows the secondary chamber 164 to inflate to the deployed position faster when the active vent 482 is actuated than when the active vent is not actuated, as can be seen in FIGS. 13-14 depicting the inflation of passenger frontal airbag 158 at similar points in time after the actuation of the second inflator 166.

In order to actuate any of the active vent 482 configurations described above, the vehicle safety system 104 can include a controller 1128 that is configured to actuate the active vent in response to sensed conditions. The controller 1128 can have a sensor 1130 for sensing the occurrence of an event, such as a collision event, for which inflation and deployment of the driver and passenger frontal airbags 152, 158 is desired. The sensor 1130 of the controller 1128 is also for sensing the occurrence of an event for which a more rapid inflation of the secondary chamber 164 is desired, such as at least one of an offset collision event and an oblique collision event. The controller 1128 is configured to selectively actuate the active vent 482 in response to the sensor 1130 detecting the occurrence of an event for which a more rapid inflation of the secondary chamber 164 is desired. The controller 1128 is also configured to actuate the first and second inflators 156, 166 in response to detecting the occurrence of an event for which inflation of the driver and passenger frontal airbags 152, 158 is desired.

For example, in use, the controller 1128 detects an occurrence of an event for which inflation of the driver and passenger frontal airbags 152, 158 is desired. Once an event for which inflation of the driver and passenger frontal airbags 152, 158 is desired has been detected, the controller 1128 actuates the first and second inflators 156, 166 to provide inflation fluid to the driver frontal airbag and the primary chamber 162 of the passenger frontal airbag to inflate and deploy the driver frontal airbag and the primary chamber, respectively. Inflation fluid is then directed from the primary chamber 162 into the secondary chamber 164 through the at least one passive vent 480 to inflate and deploy the secondary chamber. The controller 1128, at the same time as detecting the occurrence of the event for which inflation of the driver and passenger frontal airbags 152, 158 is desired, detects the occurrence of an event for which a more rapid inflation of the secondary chamber 164 is desired.

If an event for which a more rapid inflation of the secondary chamber 164 is desired is detected, the controller 1128 actuates the active vent 482 to direct inflation fluid from the primary chamber 162 to the secondary chamber at the same time as the at least one passive vent 480 directs inflation fluid from the primary chamber into the secondary chamber to inflate and deploy the secondary chamber. For example, in any of the example configurations of FIGS. 6-14, the tether 698 via which the active vent 482 can be maintained in the closed position acts on the active vent. The release device 6102 is selectively releasably connected to the tether 698 and is in electric communication with the controller 1128. If an event for which a more rapid inflation of the secondary chamber 164 is desired is detected, the controller 1128 actuates the release device 6102. The actuation of the release device 6102 releases the connection between the release device and the tether 698 so that the active vent 482 is moved to the opened position to direct inflation fluid from the primary chamber 162 to the secondary chamber 164 at the same time as the at least one passive vent 480 directs inflation fluid from the primary chamber into the secondary chamber to inflate and deploy the secondary chamber.

Figure 15:
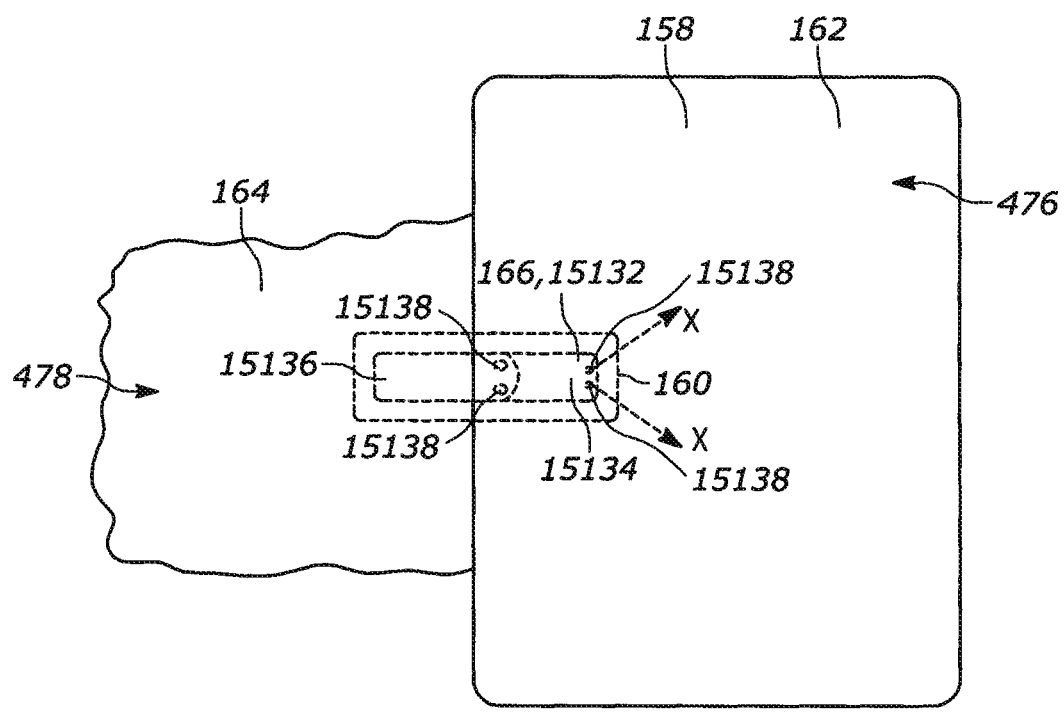
FIGS. 15-16 are perspective illustrations of a portion of the vehicle safety system, in an example configuration.
Figure 16:
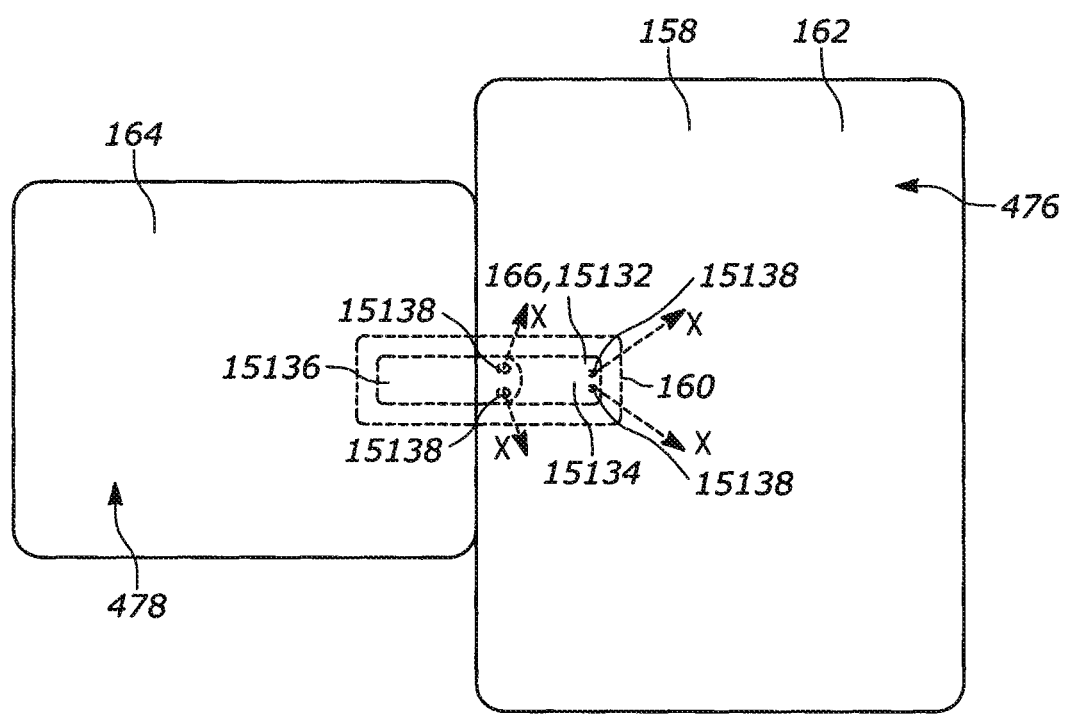

As shown in FIGS. 15-16, according to one example configuration, the second inflator 166 can be a dual-stage inflator 15132. The dual-stage inflator 15132 has first and second combustion chambers 15134, 15136. Each of the first and second combustion chambers 15134, 15136 has at least one exhaust port 15138. The exhaust ports 15138 of the first and second combustion chambers 15134, 15136 are configured to provide inflation fluid to the primary chamber 162. Alternatively, the exhaust ports 15138 of one of the first and second combustion chambers 15134, 15136 can be configured to provide inflation fluid to the primary chamber 162 while the exhaust ports of the other of the first and second combustion chambers 15134, 15136 can be configured to provide inflation fluid to the secondary chamber 164.

The controller 1128 is configured to actuate the second inflator 166 as described above. In particular, in the example configuration of FIGS. 15-16, the controller 1128 detects the occurrence of an event for which inflation of the driver and passenger frontal airbags 152, 158 is desired. Once an event for which inflation of the driver and passenger frontal airbags 152, 158 is desired is detected, the controller 1128 actuates the first inflator 156 to provide inflation fluid to the driver frontal airbag 152. The controller 1128 also actuates the first combustion chamber 15134 to provide inflation fluid to the primary chamber 162 so that the inflation fluid flows from the primary chamber to the secondary chamber 164 at a first flow rate. When the controller 1128 detects the occurrence of an event for which a more rapid inflation of the secondary chamber 164 is desired, the second combustion chamber 15136 is actuated to provide inflation fluid to the primary chamber 162 at the same time as the first combustion chamber 15134 so that the inflation fluid flows from the primary chamber to the secondary chamber at a second flow rate. The second flow rate is greater than the first flow rate so that inflation fluid flows faster into the primary chamber 162 when the controller 1128 detects the occurrence of an event for which a more rapid inflation of the secondary chamber 164 is desired than when the controller does not detect the occurrence of an event for which a more rapid inflation of the secondary chamber is desired. The increase in flow rate allows the secondary chamber 164 to inflate to the deployed position faster when the second combustion chamber 15136 is actuated than when the second combustion chamber is not actuated, as can be seen in FIGS. 15-16 depicting the inflation of passenger frontal airbag 158 at similar points in time after the actuation of the second inflator 166. Inflation fluid provided to the primary chamber 162 by at least one of the first and second combustion chambers 15134, 15136 can be provided to the secondary chamber 164 through the at least one passive vent 480 and the at least one active vent 482, when actuated and in the opened position as described above.

There are many vehicle collision/impact scenarios for which the driver frontal airbag 152, the primary chamber 162 of the passenger frontal airbag 158, and the secondary chamber 164 of the passenger frontal airbag can help protect the vehicle occupants 106a, 106b. For example, the driver frontal airbag 152 can help protect the driver 106a if the vehicle 102 is involved in a frontal impact. Similarly, the passenger frontal airbag 158 can help protect the passenger 106b if the vehicle 102 is involved in a frontal impact. A frontal impact is meant to refer to scenarios where the impact results in the occupant 106 moving forward in the vehicle 102 in a direction generally parallel to the vehicle centerline 114 and the direction of forward vehicle travel (see arrow A). In the event of a frontal impact, the driver 106a moves forward in the vehicle 102 in a direction indicated generally by the arrow labeled B in FIG. 2 toward the steering wheel 142, and the passenger 106b moves forward in the vehicle 102 in a direction indicated generally by the arrow labeled C in FIG. 2 toward the instrument panel 146.

When a frontal impact occurs, the driver frontal airbag 152 can be sufficient to provide adequate protection to the driver 106a. Because the driver 106a travels generally in the direction B toward the steering wheel 142, the driver impacts the driver frontal airbag 152 generally squarely, moving substantially perpendicular to a lateral axis 2140 of the driver frontal airbag. Because of this, the driver frontal airbag 152 receives and absorbs or dissipates the vast majority of the forces of the impacting driver 106a.

Similarly, when a frontal impact occurs, the primary chamber 162 of the passenger frontal airbag 158 can be sufficient to provide adequate protection to the passenger 106b. Because the passenger 106b travels generally in the direction C toward the instrument panel 146, the passenger impacts the primary chamber 162 of the passenger frontal airbag 158 generally squarely, moving substantially perpendicular to a lateral axis 2142 of the passenger frontal airbag. Because of this, the passenger frontal airbag 158 receives and absorbs or dissipates the vast majority of the forces of the impacting passenger 106b.

An offset and/or oblique impact is meant to refer to scenarios where the impact results in the occupant 106 moving obliquely forward in the vehicle 102 in a direction that is non-parallel to the vehicle centerline 114 and the direction of forward vehicle travel (see arrow A). For example, a left oblique impact can occur on the driver side 110 of the vehicle 102 in response to, for example, the vehicle skidding at an angle into another vehicle or barrier, or in response to being struck by another vehicle moving at an angle. The left oblique impact is illustrated generally by the double arrow labeled D in FIG. 3. Similarly, a right oblique impact can occur on the passenger side 112 of the vehicle 102 in response to, for example, the vehicle skidding at an angle into another vehicle or barrier, or in response to being struck by another vehicle moving at an angle. The right oblique impact is illustrated generally by the double arrow labeled E in FIG. 3.

In the event of an offset and/or oblique impact, the occupants 106a, 106b move forward in the vehicle 102 in a direction that is angled either inboard of the vehicle (i.e., toward the vehicle centerline 114) or outboard of the vehicle (i.e., toward the vehicle side structures 130a, 130b). For example, in the event of a left oblique impact, the driver 106a moves outboard (arrow G) and the passenger 106b moves inboard (arrow F). Conversely, in the event of a right oblique impact, the driver 106a moves inboard (arrow F) and the passenger 106b moves outboard (arrow G).

The driver frontal airbag 152 and the primary chamber 162 of the passenger frontal airbag 158 can help protect the occupants 106a, 106b in the event of an oblique impact, but not necessarily to the extent that they are able to help protect the occupants in a frontal impact. The degree to which the driver frontal airbag 152 and the primary chamber 162 of the passenger frontal airbag 158 can help protect the occupants 106a, 106b in an oblique impact depends on the degree to which the occupants movement deviates from the forward direction (i.e., the angle between arrow A and D or between arrow A and E). As the degree to which the occupant movement deviates from the forward direction, i.e., as the angle increases, the ability of the driver frontal airbag 152 and the primary chamber 162 of the passenger frontal airbag 158 to help protect the occupants 106a, 106b also decreases. Thus, as the occupants' movements become increasingly oblique, the ability of the driver frontal airbag 152 and the primary chamber 162 of the passenger frontal airbag 158 to help protect the occupants 106a, 106b decreases.

Known safety systems can include features that help protect the occupant 106 in the event of an oblique and/or an offset impact that causes the occupant to move forward and outboard in the vehicle 102. For example, side impact airbags or curtain airbags, both of which are inflatable between the occupant 106 and the side structure 130a, 130b, can help protect the occupant in the event of an oblique and/or an offset impact that moves them in the forward-outboard direction.

The secondary chamber 164 can help to address some unique challenges presented by oblique and/or offset impacts. For example, when oblique impacts can cause the occupants 106a, 106b to move in a forward and inboard direction (arrow F), the occupants move toward the positions indicated generally in dashed lines in FIG. 4. Of course, the oblique direction in which the occupant 106 moves, and their resulting position, can vary depending on the particulars of the impact event, such as the angle and/or velocity at which the vehicle 102 impacts another vehicle or object. Therefore, the oblique inboard direction of occupant movement indicated by arrow F and the resulting positions of the occupants 106a and 106b are by way of example only.

Advantageously, the secondary chamber 164, both alone and in combination with the primary chamber 162 and driver frontal airbag 152 can help protect the vehicle occupants 106b and 106a in the event of an oblique condition (left oblique D, right oblique E) that results in forward-inboard occupant movement (arrow F). The secondary chamber 164 is configured to cooperate with the architecture of the vehicle 102 in order to provide the bag with the structural integrity necessary to help protect the occupant 106. The forward-inboard oblique and/or offset collision is unique in that the vehicle safety system 104 must react to and absorb or otherwise cushion both forward and inboard occupant movement.

The driver frontal airbag 152 may not be particularly adept at this function, as it is necessarily limited in width/radius owing to the fact that it is steering wheel mounted. Additionally, its rounded, oblong face presented toward the driver 106a is more likely to cause the forward-inboard moving driver to slide or otherwise come off the driver frontal airbag 152. Further, the forward-inboard movement of the driver 106a presents the possibility that the driver can escape the shoulder belt portion 124a of the seatbelt 120a.

The primary chamber 164 of the passenger frontal airbag 158 may be more adept at reacting to and absorbing or otherwise cushioning both forward and inboard occupant movement due to its increased size and coverage of the instrument panel 146. Nevertheless, there still exists some areas, such as central portions of the instrument panel, that may lack adequate coverage. Additionally, the passenger 106b is more likely to be positioned away from the traditional/normal seating position at the time of the oblique impact. These out of position occupants can, for example, be leaned against the side structure 130b, can have the seat 108b in a reclined position, can be leaned forward or toward the vehicle centerline 114, for example leaning on a center armrest 1144 of the vehicle 102. Forward-inboard movement of an out of position passenger 106b can also result in the primary chamber 164 of the passenger frontal airbag 158 to providing less than adequate coverage, as the passenger could "miss" or partially "hit" the primary chamber 164. Forward-inboard movement of the passenger 106b can also present the possibility that the passenger can escape the shoulder belt portion 124b of the seatbelt 120b.

The secondary chamber 164 can be shaped commensurate with the vehicle structure and the primary chamber 162 from which it is deployed. In the illustrated example configuration, the secondary chamber 164 can have a generally rectangular configuration. The shape of the secondary chamber 164 is not as important to its configuration as is the need to provide coverage to the desired portion of the uncovered area between the primary chamber 162 and the driver frontal airbag 152. To this extent, the secondary chamber 164 can span the space between the primary chamber 162 and the driver frontal airbag 152 and can even engage the driver frontal airbag 152. The driver frontal airbag 152, primary chamber 162 of the passenger frontal airbag 158, and secondary chamber 164 of the passenger frontal airbag can thus provide an inflated wall of protection that spans from adjacent or near the side structure 130a on the driver side 110 of the vehicle 102 to adjacent or near the side structure 130b on the passenger side 112 of the vehicle.

Additionally, because the secondary chamber 164 is connected to the primary chamber 162 and receives its inflation fluid from the primary chamber, the primary chamber can deploy substantially prior to the secondary chamber. In this manner, the primary chamber 162 can initially deploy rearward in the vehicle 102 toward its deployed position. When the primary chamber 162 reaches a certain degree of inflation and pressurization, the secondary chamber 164 will begin receiving inflation fluid and begin to deploy. The primary chamber 162 can thus deploy partially and/or substantially before the secondary chamber 164. The primary chamber 162 can deploy rearward in the vehicle 102, followed by the secondary chamber 164, which deploys laterally in the vehicle. Since the secondary chamber 164 has a construction in which the secondary chamber has a smaller volume than the primary chamber 162, it will inflate and deploy quickly so as to reach the desired position within the desired period of time. Advantageously, this also allows the large volume primary chamber 162 to inflate and deploy quickly because the secondary chamber 164 does not divert a significant volume of inflation fluid from the primary chamber.

The secondary chamber 164 is illustrated and described as being implemented with the passenger frontal airbag 158. The secondary chamber 164 could, however, have alternative implementations. For example, the secondary chamber 164 could be implemented with the driver frontal airbag 152. In this implementation, the secondary chamber 164 could have a radial configuration and extend radially from the driver frontal airbag 152. As another implementation, the secondary chamber 164 could be implemented in a driverless automobile, where it is envisioned that the entire steering wheel 142 may not necessarily rotate in the traditional sense, instead, for example, only the rim 150 moves or rotates in a steer-by-wire system.

Additionally, the secondary chamber 164 could be implemented in other conventional airbags, such as door-mounted side impact airbags, seat-mounted side impact airbags, pillar airbags, curtain airbags, frontal airbags for rear seat occupants, knee bolsters, and inflatable seatbelts.

From the above description of the invention, those skilled in the art will perceive improvements, changes and modifications. For example, although the present invention has been described and illustrated in a passenger frontal airbag implementation, those skilled in the art will appreciate that the present invention may have other alternative implementations, such as a driver frontal airbag implementation. Such improvements, changes and modifications within the skill of the art are intended to be covered by the appended claims.

Having described the invention, the following is claimed:

1. An apparatus for helping to protect an occupant of a vehicle, comprising:
   an airbag comprising a primary chamber and a secondary chamber, the primary chamber having a stored condition and being inflatable to a deployed condition to cover a portion of the vehicle and to help provide protection from impacts with the covered portion of the vehicle, the secondary chamber having a stored condition and being inflatable to a deployed condition to cover portions of the vehicle left uncovered by the primary chamber;

at least one passive vent that provides fluid communication between the primary and secondary chambers;

at least one active vent that is actuatable to provide fluid communication between the primary and secondary chambers; and an inflator actuatable to provide inflation fluid to the primary chamber to inflate the primary chamber, wherein the at least one passive vent directs inflation fluid from the primary chamber into the secondary chamber, and wherein the at least one active vent is actuatable to direct inflation fluid from the primary chamber to the secondary chamber.

2. The apparatus recited in claim 1, wherein a flow rate of the inflation fluid flowing from the primary chamber into the secondary chamber when the active vent is actuated is greater than a flow rate of the inflation fluid flowing from the primary chamber to the secondary chamber when the active vent is not actuated.

3. The apparatus recited in claim 1, further comprising a controller configured to actuate the inflator and the actuatable vent in response to sensed conditions, wherein the controller is configured to actuate the inflator in response to detecting the occurrence of an event for which inflation of the airbag is desired, and wherein the controller is configured to selectively actuate the active vent in response to detecting the occurrence of an event for which a more rapid inflation of the secondary chamber is desired.

4. The apparatus recited in claim 3, wherein the event for which a more rapid inflation of the secondary chamber is desired comprises at least one of an offset collision and an oblique collision.

5. The apparatus recited in claim 3, further comprising:
a tether via which the active vent can be maintained in a closed position acts on the active vent; and
a release device being selectively releasably connected to the tether, the release device being in electric communication with the controller;
wherein the controller is configured to selectively actuate the release device in response to detecting the occurrence of an event for which a more rapid inflation of the secondary chamber is desired, the actuation of the release device releasing the connection between the release device and the tether so that the active vent is moved to an opened position.

6. The apparatus recited in claim 5, wherein during an initial deployment phase of the airbag, the active vent is in the closed position.

7. The apparatus recited in claim 5, wherein the occurrence of an event for which a more rapid inflation of the secondary chamber is desired comprises at least one of an offset collision and an oblique collision;
wherein if the collision event is at least one of an offset collision and an oblique collision, the controller actuates the release device to release the connection between the release device and the tether, the release of the connection between the release device and the tether moving the active vent to the opened position so that the active vent and the at least one passive vent directs inflation fluid from the primary chamber to the secondary chamber; and
wherein if the collision event is not at least one of an offset collision and an oblique collision, the controller does not actuate the release device so that the connection between the release device and the tether is maintained, the maintenance of the connection between the release device and the tether holding the active vent in the closed position so that the at least one passive vent directs inflation fluid from the primary chamber to the secondary chamber.

8. The apparatus recited in claim 1, wherein the inflator is a dual-stage inflator having first and second combustion chambers, each of the first and second combustion chambers having at least one exhaust port, the exhaust ports of the first and second combustion chambers being configured to provide inflation fluid to the primary chamber.

9. The apparatus recited in claim 8, further comprising a controller configured to actuate the inflator and the actuatable vent in response to sensed conditions, wherein when the controller detects the occurrence of an event for which inflation of the airbag is desired, the controller actuates the first combustion chamber to provide inflation fluid to the primary chamber so that the inflation fluid flows from the primary chamber to the secondary chamber at a first flow rate, and when the controller detects the occurrence of an event for which a more rapid inflation of the secondary chamber is desired, the second combustion chamber is actuated to provide inflation fluid to the primary chamber at the same time as the first combustion chamber so that the inflation fluid flows from the primary chamber to the secondary chamber at a second flow rate, the second flow rate being greater than the first flow rate.

10. The apparatus recited in claim 1, wherein the primary chamber, when inflated, is disposed directly forward of a vehicle seat in which the occupant is seated, and the secondary chamber, when inflated, is laterally inboard of the primary chamber.

11. The apparatus recited in claim 1, wherein the airbag is a passenger frontal airbag that is inflatable between an instrument panel of the vehicle and a passenger-side vehicle seat, and wherein the primary chamber, when inflated and deployed, covers a portion of the instrument panel that is presented in front of the passenger-side vehicle seat and spans at least substantially across the width of the passenger-side vehicle seat.

12. The apparatus recited in claim 11, wherein when the secondary chamber is inflated and deployed, the secondary chamber covers a portion of the instrument panel positioned laterally inboard of the primary chamber.

13. The apparatus recited in claim 11, wherein when the secondary chamber is inflated and deployed, the secondary chamber covers a portion of the instrument panel positioned laterally inboard of the passenger-side vehicle seat.

14. The apparatus recited in claim 1, wherein when the secondary chamber is inflated and deployed, the secondary chamber is configured to receive an occupant moving in an oblique direction in the vehicle.

15. The apparatus recited in claim 1, wherein the primary chamber has a total inflated volume that is greater than a total inflated volume of the secondary chamber.

16. The apparatus recited in claim 1, wherein both of the primary and secondary chambers are free from any vents for venting inflation fluid external to the airbag.

17. An airbag module comprising the apparatus of claim 1.

18. A vehicle safety system comprising the airbag module of claim 15.

19. A method of protecting an occupant of a vehicle, comprising:
providing the apparatus for helping to protect an occupant of a vehicle according to claim 1;

detecting the occurrence of an event for which inflation of the airbag is desired;

once an event for which inflation of the airbag is desired has been detected, actuating the inflator to provide inflation fluid to the primary chamber to inflate and deploy the primary chamber;

directing inflation fluid from the primary chamber into the secondary chamber through the at least one passive vent to inflate and deploy the secondary chamber;

detecting the occurrence of an event for which a more rapid inflation of the secondary chamber is desired; and if an event for which a more rapid inflation of the secondary chamber is desired is detected, actuating the active vent to direct inflation fluid from the primary chamber to the secondary chamber at the same time as the at least one passive vent directs inflation fluid from the primary chamber into the secondary chamber to inflate and deploy the secondary chamber.

20. The method of claim 19, wherein the inflator is a dual-stage inflator having first and second combustion chambers, each of the first and second combustion chambers having at least one exhaust port, the exhaust ports of the first and second combustion chambers being configured to provide inflation fluid to the primary chamber, the method further comprises:

once an event for which inflation of the airbag is desired has been detected, actuating the first combustion to provide inflation fluid to the primary chamber to inflate and deploy the primary chamber; and if an event for which a more rapid inflation of the secondary chamber is desired is detected, actuating the second combustion chamber to provide inflation fluid to the primary chamber to inflate and deploy the primary chamber at the same time as the first combustion chamber provides inflation fluid to the primary chamber to inflate and deploy the primary chamber.

21. The method of claim 19, wherein the apparatus for helping to protect an occupant of a vehicle further comprises:

a controller configured to actuate the inflator and the actuatable vent in response to sensed conditions, wherein the controller is configured to actuate the inflator in response to detecting the occurrence of an event for which inflation of the airbag is desired, and wherein the controller is configured to selectively actuate the active vent in response to detecting the occurrence of an event for which a more rapid inflation of the secondary chamber is desired, a tether via which the active vent can be maintained in a closed position acts on the active vent, and a release device being selectively releasably connected to the tether, the release device being in electric communication with the controller, and the method further comprises:

utilizing the controller to detect the occurrence of an event for which inflation of the airbag is desired;

once an event for which inflation of the airbag is desired has been detected, utilizing the controller to actuate the inflator to provide inflation fluid to the primary chamber to inflate and deploy the primary chamber;

utilizing the controller to detect the occurrence of an event for which a more rapid inflation of the secondary chamber is desired; and if an event for which a more rapid inflation of the secondary chamber is desired is detected, utilizing the controller to actuate the release device, the actuation of the release device releasing the connection between the release device and the tether so that the active vent is moved to an opened position to direct inflation fluid from the primary chamber to the secondary chamber.

* * * * *